US012703113B2

(12) United States Patent
Oka et al.

(10) Patent No.: US 12,703,113 B2
(45) Date of Patent: Aug. 11, 2026

(54) HAND, HANDLING ROBOT, CONTROL DEVICE, METHOD FOR CONTROLLING HAND, AND STORAGE MEDIUM

(71) Applicant: KABUSHIKI KAISHA TOSHIBA, Tokyo (JP)

(72) Inventors: Yoshifumi Oka, Yokohama (JP); Haruna Eto, Kawasaki (JP); Harutoshi Chatani, Yokohama (JP); Seiji Tokura, Kawasaki (JP); Akihito Ogawa, Fujisawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 18/498,177

(22) Filed: Oct. 31, 2023

(65) Prior Publication Data

US 2024/0139973 A1 May 2, 2024

(30) Foreign Application Priority Data

Oct. 31, 2022 (JP) ................................ 2022-174756

(51) Int. Cl.
*B25J 9/16* (2006.01)
*B25J 15/06* (2006.01)
*B25J 15/10* (2006.01)

(52) U.S. Cl.
CPC ............ *B25J 15/10* (2013.01); *B25J 9/1612* (2013.01); *B25J 9/1664* (2013.01); *B25J 15/0616* (2013.01); *G05B 2219/39514* (2013.01); *G05B 2219/40567* (2013.01)

(58) Field of Classification Search
CPC ........ B25J 15/10; B25J 9/1612; B25J 9/1664; B25J 15/0616; G05B 2219/39514; G05B 2219/40567
See application file for complete search history.

(56) References Cited

U.S. PATENT DOCUMENTS 10,335,947 B1 7/2019 Diankov et al.
10,576,630 B1 3/2020 Diankov et al.
11,745,337 B2 9/2023 Eto et al.
12,064,886 B1 * 8/2024 Terhuja .................. B25J 9/1684
12,122,049 B1 * 10/2024 Ivanov .................. B25J 9/1664
(Continued)

FOREIGN PATENT DOCUMENTS

JP S-60-080585 A 5/1985
JP 2009-045687 A 3/2009
(Continued)

OTHER PUBLICATIONS

Office Action issued Jun. 11, 2026 in Japanese Patent Application No. 2022-174756.

*Primary Examiner* — Sohana Tanju Khayer
(74) *Attorney, Agent, or Firm* — Oblon, McClelland, Maier & Neustadt, L.L.P.

(57) ABSTRACT

According to one embodiment, a hand includes a gripper, a driver, and a controller. The gripper is configured to grip an object. The driver drives the gripper. When a stability when gripping the object is estimated, the controller causes the driver to perform a first motion to increase the stability. The stability is estimated based on contact information of the gripper for the object, and characteristic information including at least one of a size or a weight of the object.

24 Claims, 17 Drawing Sheets

(56) References Cited

U.S. PATENT DOCUMENTS 12,162,139 B1* 12/2024 Gonzalez Diaz ........ B25J 15/08
2012/0004774 A1 1/2012 Umetsu
2012/0207574 A1* 8/2012 La Rovere ........... B25J 15/0616 414/751.1
2014/0188277 A1* 7/2014 Lee ...................... B25J 15/0033 901/31
2019/0210223 A1* 7/2019 Goldberg ................ G06T 17/20
2019/0308333 A1 10/2019 Chen et al.
2020/0023527 A1* 1/2020 Hwang ................ B25J 15/0085
2021/0138655 A1* 5/2021 Mousavian ............ B25J 9/1666
2021/0188554 A1* 6/2021 Kalouche .................. B07C 3/08
2021/0291366 A1 9/2021 Eto et al.
2022/0032462 A1* 2/2022 Kawakami ............. B25J 9/1669
2022/0355490 A1* 11/2022 Matsuda ................ B25J 13/082
2022/0379484 A1* 12/2022 Tremblay ................. B25J 13/08
2022/0405439 A1* 12/2022 Pidaparthi ............... G06F 30/20
2023/0046345 A1 2/2023 Oka et al.
2023/0064919 A1* 3/2023 Shaw ................... B25J 15/0009
2023/0264365 A1* 8/2023 Maeda ..................... B25J 15/08 700/253
2023/0331416 A1* 10/2023 Matl ...................... B25J 9/1697
2023/0405841 A1* 12/2023 Liu .......................... B25J 15/10
2024/0009851 A1* 1/2024 Mousavian ............ B25J 9/1697
2024/0100718 A1* 3/2024 Yonemura .............. B25J 13/082
2024/0139941 A1 5/2024 Chatani et al.
2024/0149458 A1* 5/2024 Watabe .................. B25J 9/1689
2024/0286278 A1* 8/2024 Kitano ................... B25J 9/1612
2024/0383151 A1* 11/2024 Nishida ................... G06T 11/00
2025/0033225 A1* 1/2025 Geating ............... B25J 15/0616
2025/0041910 A1* 2/2025 Holopainen ......... B25J 15/0616
2025/0068175 A1* 2/2025 Davison .................... G06T 7/50

FOREIGN PATENT DOCUMENTS

JP 2010-069542 A 4/2010
JP 5505138 B2 5/2014
JP 2019-155542 A 9/2019
JP 6700726 B2 5/2020
JP 2020-124800 A 8/2020
JP 2020-196120 A 12/2020
JP 6912415 B2 8/2021
JP 2023-26187 A 2/2023
JP 7315499 B2 7/2023
JP 7364505 B2 10/2023
JP 2024-65780 A 5/2024

* cited by examiner

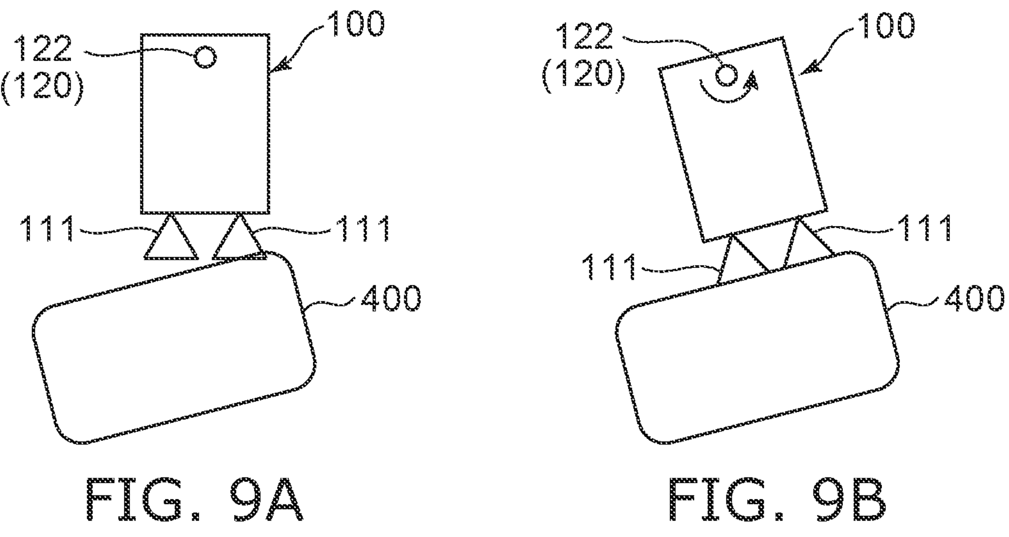
FIG. 9A
FIG. 9B
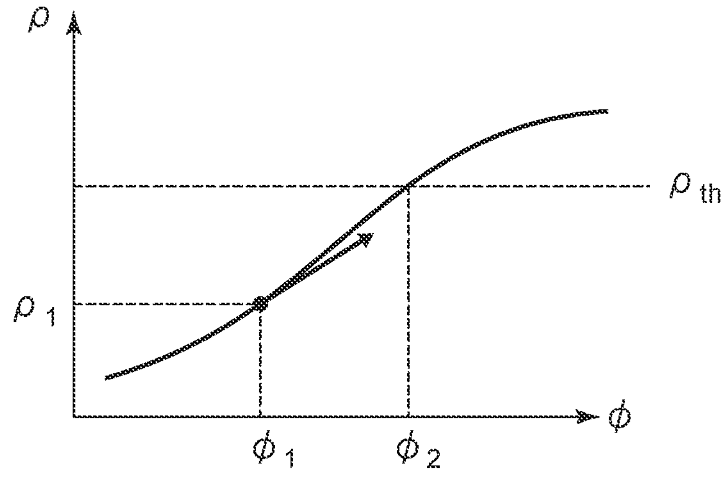
FIG. 9C

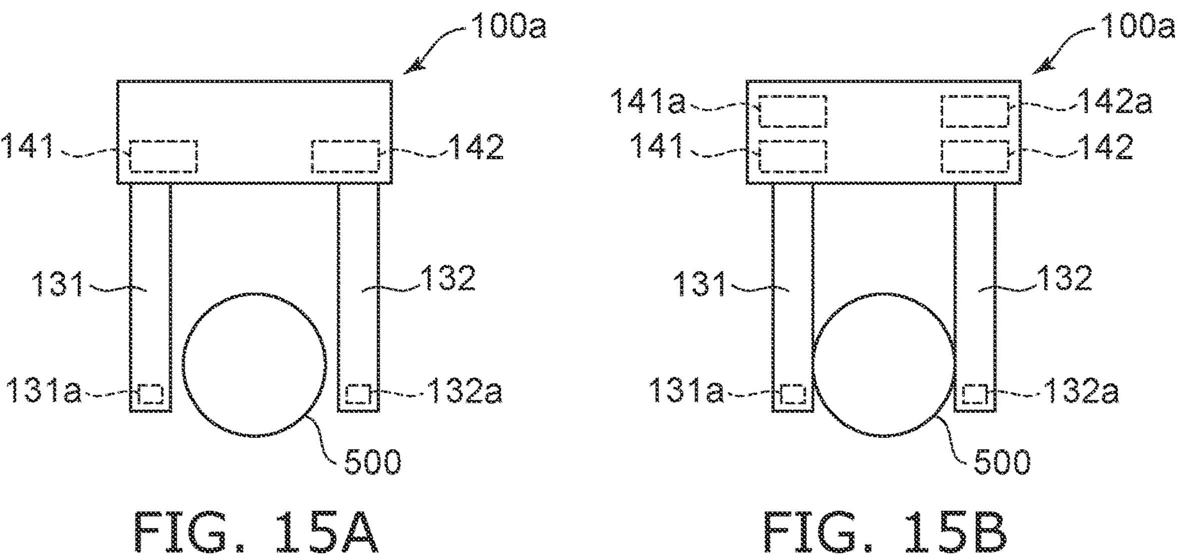
FIG. 15A
FIG. 15B
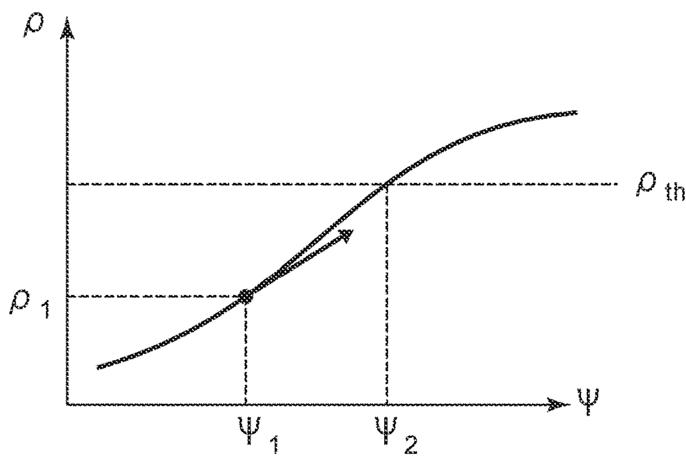
FIG. 15C

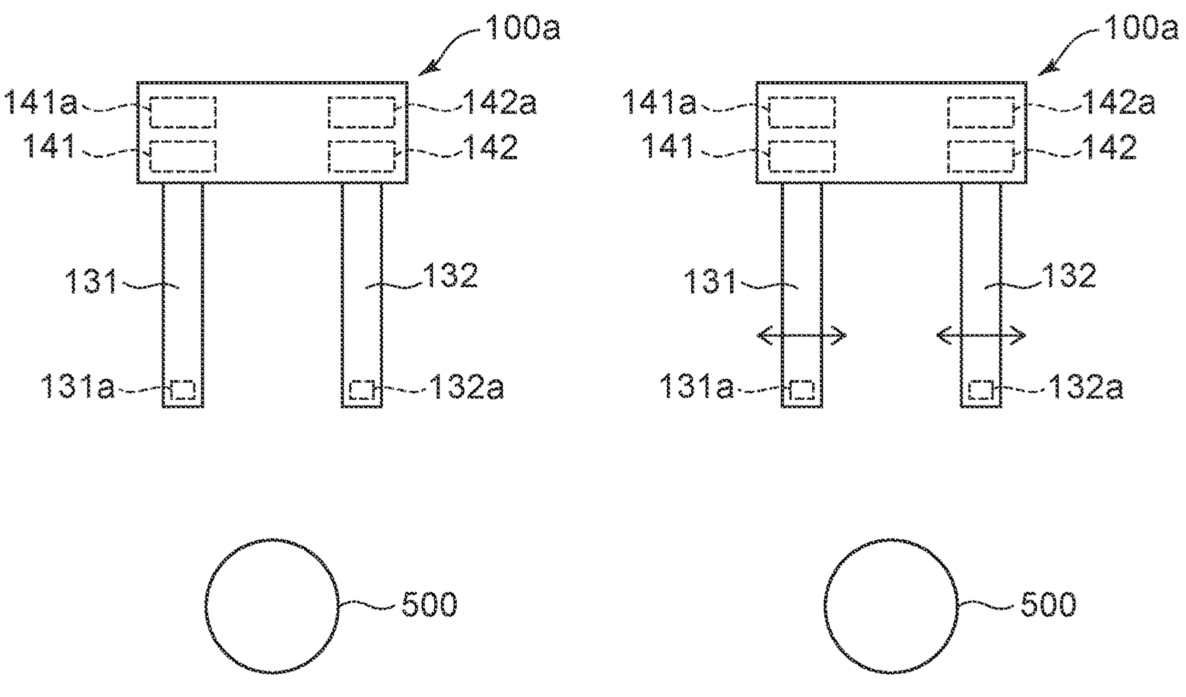
FIG. 16A
FIG. 16B
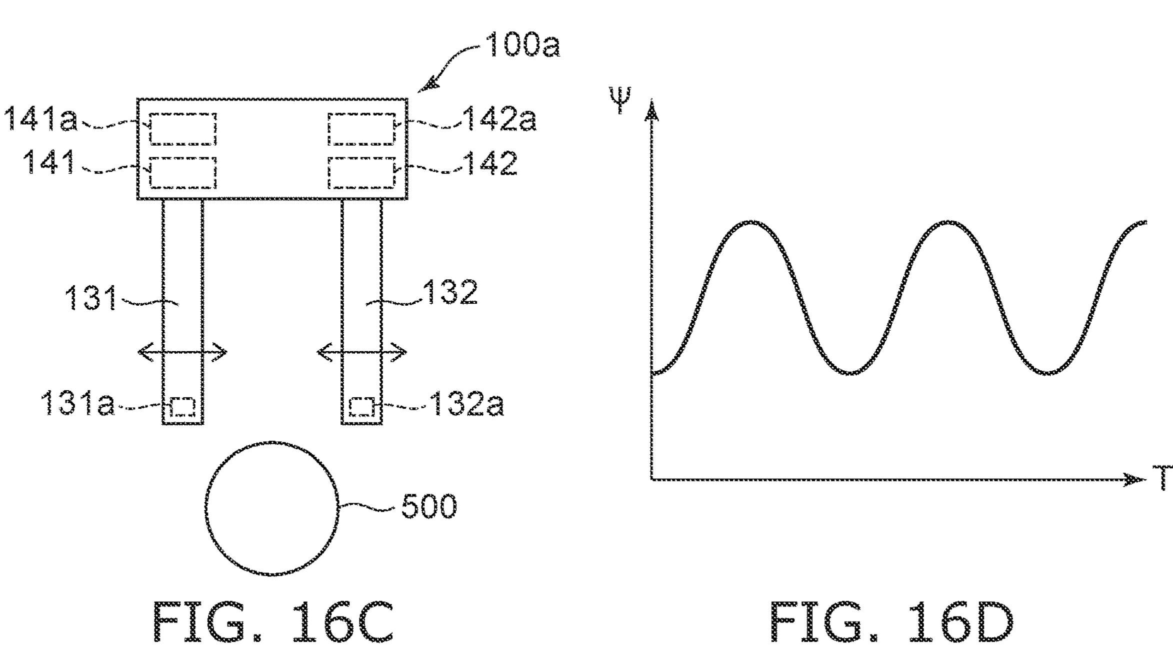
FIG. 16C
FIG. 16D

HAND, HANDLING ROBOT, CONTROL DEVICE, METHOD FOR CONTROLLING HAND, AND STORAGE MEDIUM

CROSS-REFERENCE TO RELATED APPLICATIONS

This application is based upon and claims the benefit of priority from Japanese Patent Application No. 2022-174756, filed on Oct. 31, 2022; the entire contents of which are incorporated herein by reference.

FIELD

Embodiments described herein relate generally to a hand, a handling robot, a control device, a method for controlling a hand, and a storage medium.

BACKGROUND

There is a handling robot including a hand configured to grip an object. It is desirable for the handling robot to be able to grip the object more stably.

BRIEF DESCRIPTION OF THE DRAWINGS

FIGS. 9A and 9B are schematic views showing a motion of the hand in the first control, and FIG. 9C is a schematic view showing the relationship between the stability and the operation of the driver;

FIGS. 15A and 15B are schematic views showing the motion of the hand in the first control, and FIG. 15C is a schematic view showing the relationship between the stability and the operation of the driver;

FIGS. 16A to 16D are schematic views showing the motion of the hand in the second control.

DETAILED DESCRIPTION

Figure 1:
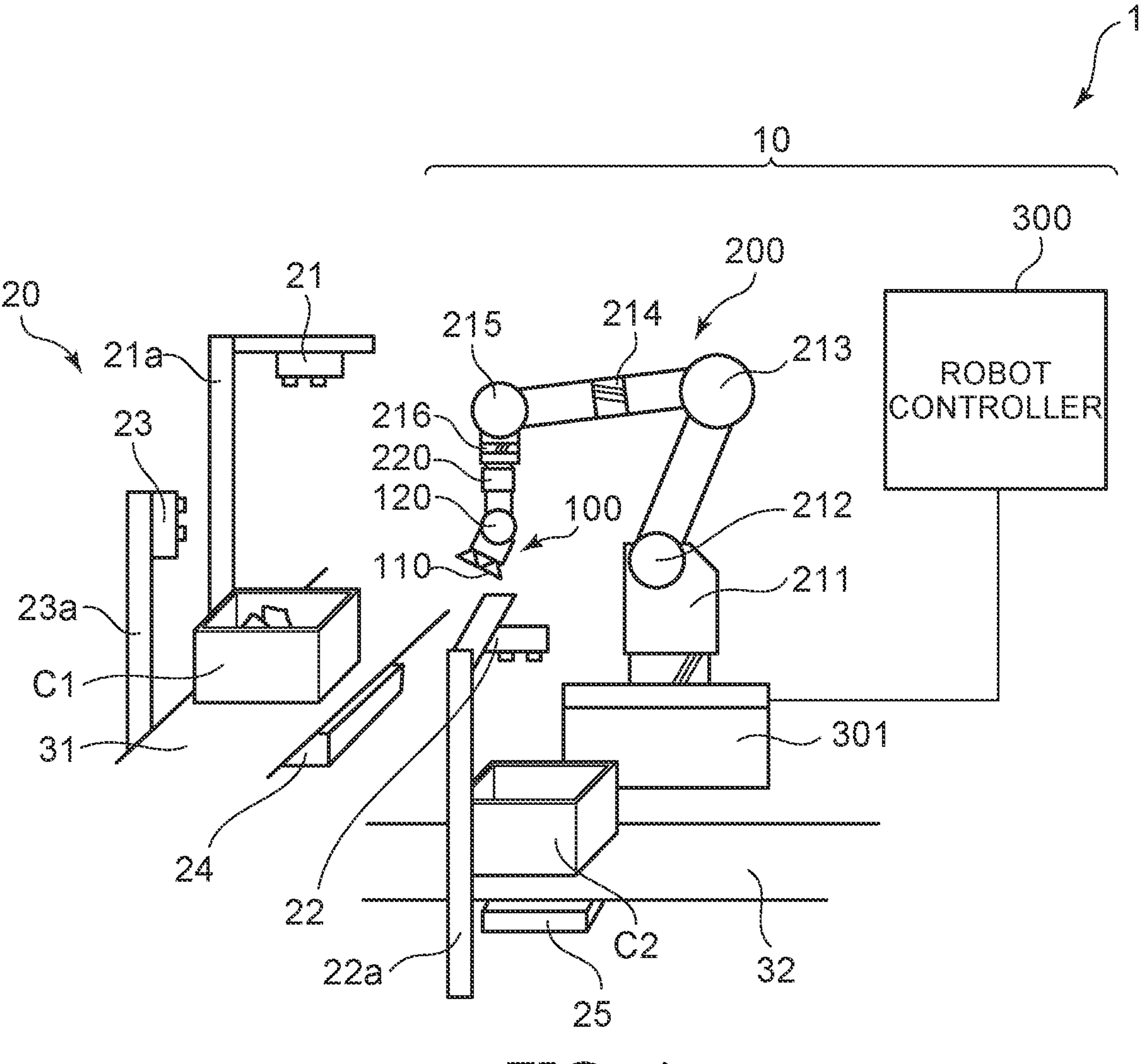
FIG. 1 is a schematic view showing a handling system according to a first embodiment.

According to one embodiment, a hand includes a gripper, a driver, and a controller. The gripper is configured to grip an object. The driver drives the gripper. When a stability when gripping the object is estimated, the controller causes the driver to perform a first motion to increase the stability. The stability is estimated based on contact information of the gripper for the object, and characteristic information including at least one of a size or a weight of the object.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

FIRST EMBODIMENT

FIG. 1 is a schematic view showing a handling system according to a first embodiment.

The handling system according to the first embodiment grips an object, moves the object, and places the object at a prescribed position. For example, the handling system performs picking. The handling system 1 shown in FIG. 1 includes a handling robot 10 and a measurement system 20. The handling robot 10 includes a hand 100, an arm 200, and a robot controller 300.

The hand 100 includes a gripper 110, a driver 120, and a not-illustrated controller. The gripper 110 is configured to grip an object. The driver 120 drives the gripper 110. The position or posture of the gripper 110 is changed by the operation of the driver 120. Herein, "position" refers to the coordinates of three axes in a prescribed three-dimensional spatial coordinate system. "Posture" refers to the angle with respect to each of the three axes. The controller controls the operations of the gripper 110 and the driver 120.

The arm 200 is an articulated robot driven by multiple servo motors. In the example shown in FIG. 1, the arm 200 is a vertical articulated robot that has the six axes of first to sixth axes 211 to 216. The arm 200 may be a horizontal articulated robot, a linear robot, or a parallel link robot. The arm 200 may include a combination of at least two selected from a vertical articulated robot, a horizontal articulated robot, a linear robot, and a parallel link robot. The hand 100 is mounted to the distal end of the arm 200.

The robot controller 300 performs handling processing by controlling the handling robot 10. For example, the handling robot 10 transfers the object from a first container C1 housing the object to a second container C2 that is different from the first container C1.

The arm 200 is mounted to a housing 301. The housing 301 is mounted to the floor surface. In the illustrated example, the gripper 110 holds the object by suction-gripping a surface of the object. The housing 301 may house a power supply, a cylinder, a compressor, a vacuum pump, an external interface such as UI, etc. The power supply supplies power to various drivers of the handling robot 10. The cylinder stores compressed air. The compressor regulates the pressure of the gripper 110 of the hand 100.

The measurement system 20 includes sensors 21 to 25. The sensor 21 (an example of a measurement sensor) acquires information of the object to be transferred and the periphery of the object. For example, the object is housed in the first container C1. The sensor 21 is located above the first container C1 and measures the entire first container C1. Shape information of the first container C1 and shape information of the objects housed in the first container C1 are acquired thereby.

The sensor 22 acquires information of the position to which the object is transferred and the periphery of the position to which the object is transferred. For example, the transferred object is housed in the second container C2. The sensor 22 is located above the second container C2 and measures the entire second container C2. Shape information of the second container C2 and shape information of the objects transferred to the second container C2 are acquired thereby.

The sensor 23 is located at the vicinity of the sensor 21 and measures the object gripped by the handling robot 10. For example, the handling robot 10 pauses in front of the sensor 23 after lifting the object. The sensor 23 measures the three-dimensional shape of the gripped object.

The sensors 21 to 23 are supported respectively by supporters 21*a* to 23*a*. The sensors 21 to 23 each include a sensor that can acquire image information or three-dimensional information such as an RGB image camera, a range image camera, a laser rangefinder (LRF), a light detection and ranging (LiDAR) device, etc.

The sensor 24 measures the weight of the first container C1. The sensor 24 is provided to measure the weight of the gripped object. For example, the weight of the object is calculated based on the measurement result of the sensor 24 before gripping the object. As an example, only one type of object is housed in the first container C1, and the weight of the first container C1 is known. In such a case, the weight of one object is calculated by subtracting the weight of the first container C1 from the weight measured by the sensor 24 and by dividing the resulting value by the number of objects. The number of housed objects may be preregistered or may be estimated based on the value of the weight of the first container C1 subtracted from the measured weight. Or, the weight of the object may be calculated based on the difference between the measurement result of the sensor 24 before gripping the object and the measurement result of the sensor 24 after the object is gripped. In such a case, the weight of the object is obtained after gripping.

The sensor 25 measures the weight of the second container C2. The sensor 25 is provided to measure the weight of the transferred object. The weight of the object is calculated based on the difference between the measurement result of the sensor 25 before transferring the object and the measurement result of the sensor 25 after the object is transferred.

The sensor 24 and the sensor 25 each include weight sensors. In the illustrated example, the first container C1 and the second container C2 are placed respectively on a loading platform 31 and a loading platform 32. The sensor 24 may measure the weight of the loading platform 31 in addition to the first container C1. The sensor 25 may measure the weight of the loading platform 32 in addition to the second container C2. In such a case, the loading platform 31 and the weight of the loading platform 32 are used as appropriate when calculating the weight of the object.

Figure 2:
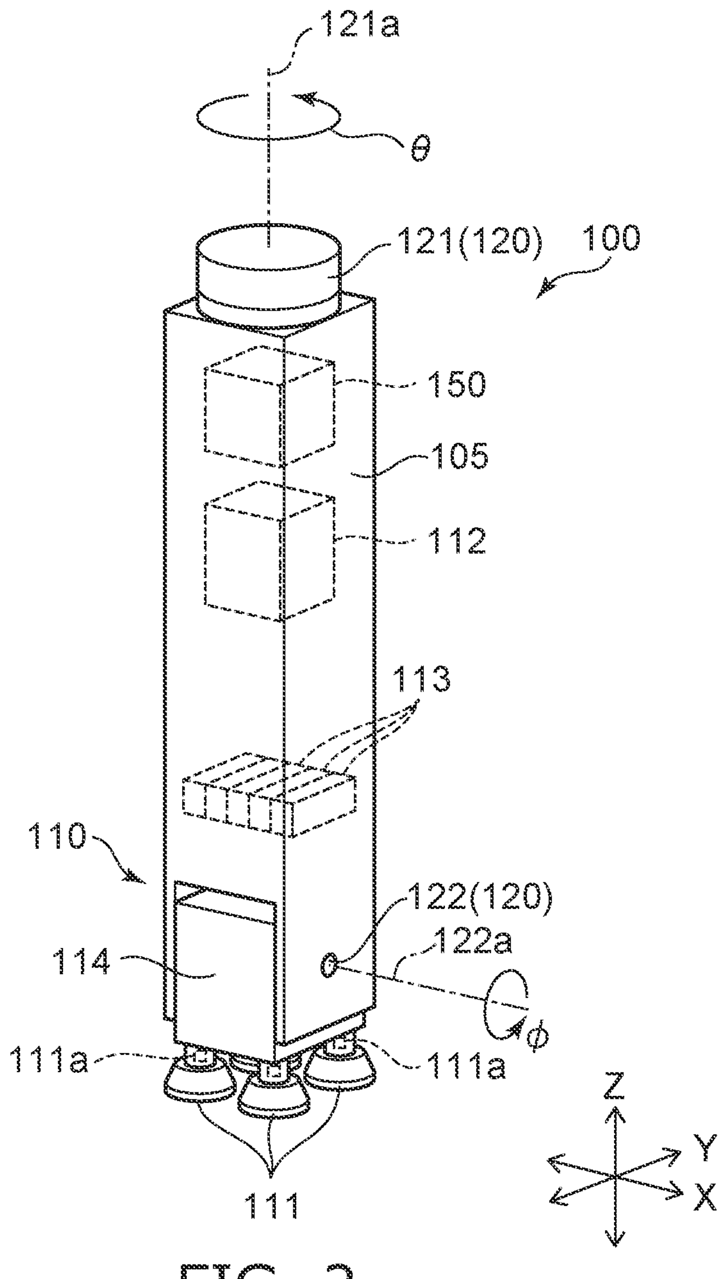
FIG. 2 is a schematic perspective view illustrating the hand according to the first embodiment.

FIG. 2 is a schematic perspective view illustrating the hand according to the first embodiment.

As shown in FIG. 2, the hand 100 includes a base 105, the gripper 110, the driver 120, and a hand controller 150. The gripper 110 includes a suction mechanism. Specifically, the gripper 110 includes a pad 111, a suction device 112, a switch valve 113, and a supporter 114. The driver 120 includes a rotation axis 121 and a rotation axis 122.

The base 105 has a rectangular parallelepiped exterior shape and forms the contour of the hand 100. The base 105 is connected to the arm 200 via the rotation axis 121. The base 105 may have a box shape or may be only a frame. The shape of the base 105 is arbitrary.

The rotation axis 121 rotatably connects the base 105 to the arm 200. An axis direction 121*a* of the rotation axis 121 is substantially parallel to a Z-direction in which the base 105 and the distal part of the arm 200 are arranged. The rotation axis 121 can rotate the base 105 in the θ-direction and the opposite direction with respect to the arm 200.

The suction device 112 is located inside the base 105. The suction device 112 is, for example, a vacuum pump. The suction device 112 communicates with each of the multiple pads 111 via hoses, etc. By driving the suction device 112, the pressure inside the pads 111 drops below atmospheric pressure; and the object is suction-gripped by the pads 111.

The supporter 114 is connected to the distal part of the base 105 via the rotation axis 122. An axis direction 122*a* of the rotation axis 122 is substantially perpendicular to the Z-direction. For example, the axis direction 122*a* is perpendicular to the axis direction 121*a*. The rotation axis 122 can rotate the supporter 114 in the d)-direction and the opposite direction with respect to the base 105.

The supporter 114 supports the multiple pads 111. The pad 111 is flexible. One end of the pad 111 is connected to a pipe; and the other end of the pad 111 is open at the side opposite to the supporter 114. The multiple pads 111 are arranged along two directions crossing each other. In the illustrated example, four pads 111 are arranged 2×2 along an X-direction and a Y-direction. The X-direction and the Y-direction are orthogonal to each other. The positions and postures of the multiple pads 111 are changed by the operation of the rotation axis 121 or 122.

The multiple switch valves 113 are provided respectively for the multiple pads 111. Each switch valve 113 is set to a suction state or a release state. In the suction state, the suction device 112 communicates with the corresponding pads 111. The internal pressure of the pad 111 is regulated by the suction device 112. In the release state, the communication between the pad 111 and the suction device 112 is blocked, and the pad 111 communicates with the outside (the atmospheric pressure space) of the hand 100. For example, the number of the switch valves 113 set to the suction state is adjusted according to the size of the object to be gripped.

The pressure inside the pad 111 is detected by a negative pressure sensor 111*a*. For example, multiple negative pressure sensors 111*a* respectively measure the pressure inside the multiple pads 111.

The object can be gripped by suction by operating the gripper 110 that includes the suction mechanism including the multiple pads 111, the suction device 112, the multiple switch valves 113, and the supporter 114.

Figure 3:
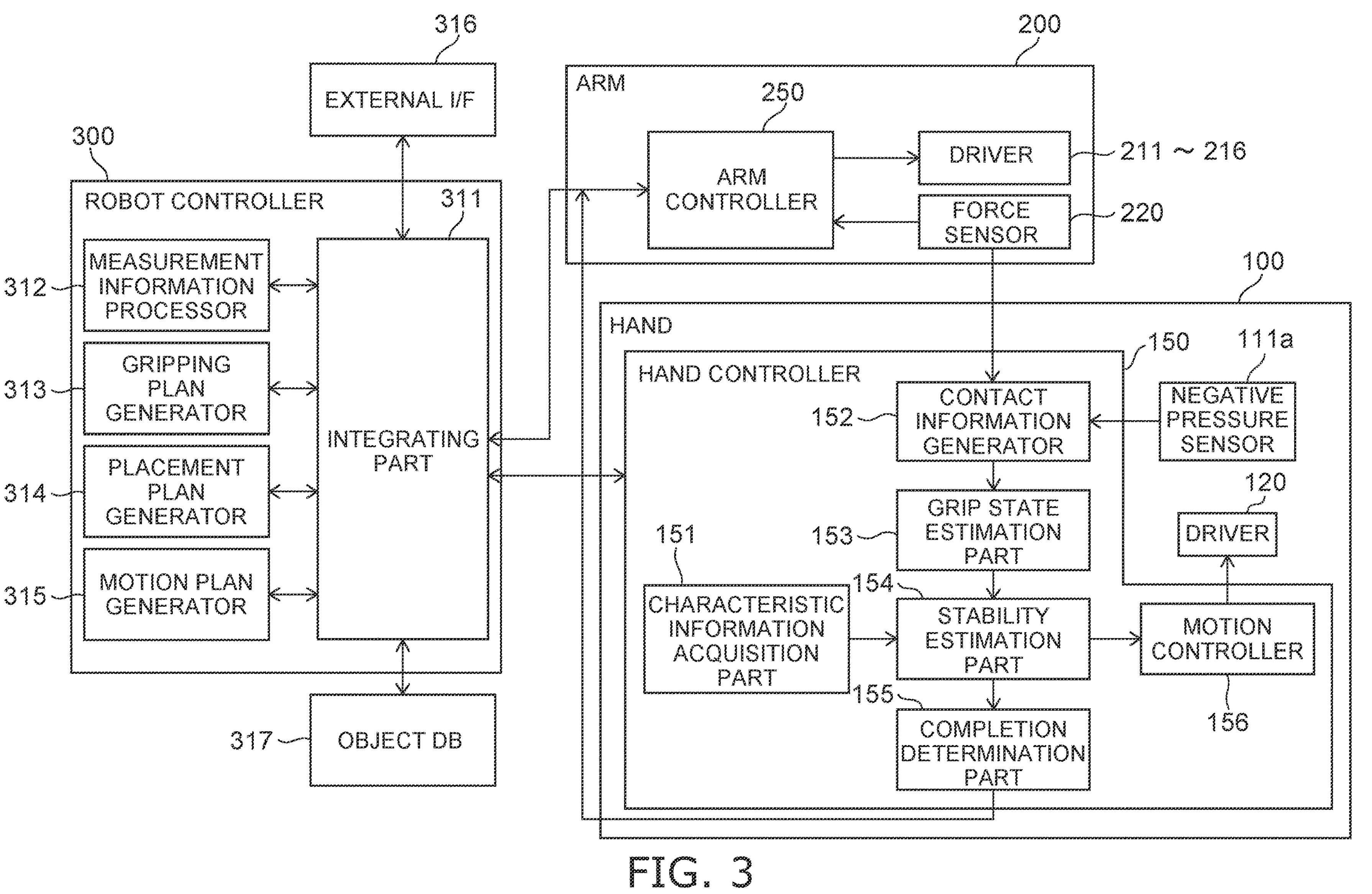
FIG. 3 is a block diagram showing a schematic configuration of a handling system according to the first embodiment.

FIG. 3 is a block diagram showing a schematic configuration of a handling system according to the first embodiment.

As shown in FIG. 3, the robot controller 300 functions as an integrating part 311, a measurement information processor 312, a gripping plan generator 313, a placement plan generator 314, and a motion plan generator 315. The handling system 1 further includes an external interface (I/F) 316 and an object database (object DB) 317.

The integrating part 311 performs the generation, implementation, management, and the like of the task plan of the handling system 1. These operations are performed based on information input via the external I/F 316, the state of the handling system 1, etc. The integrating part 311 can receive information input by a user or another control device via the external I/F 316.

The measurement information processor 312 processes information obtained from the sensors of the measurement system 20. The measurement information processor 312 processes the information to generate information necessary for motion planning, motion control, error detection, etc.

For example, the sensor 21 includes an image sensor and a depth sensor. When the sensor 21 images the first container C1 and the object inside the first container C1, the measurement information processor 312 performs image recognition. The measurement information processor 312 obtains three-dimensional shape information of the object from the image recognition. The measurement information processor 312 also accesses the object DB 317 and acquires the weight and size of the object. The value that is measured by the sensor 24 may be used as the weight of the object.

The gripping plan generator 313 generates (calculates) a gripping plan for the handling system 1. The gripping plan includes the gripping methods, the grip position, the grip posture, via-points, etc. The gripping method refers to the method when the hand 100 grips the object. The grip position refers to the position of the hand 100 when gripping the object. The grip posture refers to the posture of the hand 100 when gripping the object. The via-point refers to the positions through which the hand 100 passes until the grip position is reached. The gripping plan generator 313 calculates the grip position and the grip posture based on the three-dimensional shape of the object measured by the sensor 21.

For example, the distal part of the hand 100 is controlled to have the grip positions and the grip postures when gripping the object. When handling the object, the arm 200 is controlled so that the distal part of the hand 100 passes through the via-points. In other words, the control point of the handling robot 10 is set to the distal part (the gripper 110) of the hand 100. However, the control point is not limited to the example and is modifiable as appropriate. In the following description, the position or posture of the control point of the hand 100 is called simply the position or posture of the hand 100.

The placement plan generator 314 generates (calculates) the placement plan for the handling system 1. The placement plan includes the placement position, the placement posture, via-points, etc. The placement position refers to the position of the hand 100 when placing the transferred object. The placement posture refers to the posture of the hand 100 at the placement position. The via-points indicate the positions through which the hand 100 passes to reach the placement position.

The motion plan generator 315 generates (calculates) the motion plan for the handling system 1. The motion plan includes a gripping motion, a transfer motion, a placement motion, etc. The gripping motion refers to the motion of the hand 100 and the arm 200 so that the hand 100 moves from above the grip position to the grip position and posture. The transfer motion refers to the motion of the arm 200 from above the grip position to above the placement position. The placement motion refers to the motion of the hand 100 and the arm 200 from above the placement position to the placement position and the placement posture.

The arm 200 includes an arm controller 250. The arm controller 250 controls the arm 200 based on motion information of the arm 200. The motion information of the arm 200 is generated by the motion plan generator 315 of the robot controller 300 described above.

As shown in FIG. 3, the arm 200 may include a force sensor 220. The force sensor 220 detects the force acting on the distal end of the arm 200. The force that acts on the distal end of the arm 200 corresponds to the force acting on the hand 100. Force control may be performed so that a target force is detected based on the detected value of the force sensor 220. Or, the force sensor 220 may be located in the hand 100.

The robot controller 300 controls the handling system 1 including the hand 100 and the arm 200 according to robot operation information, the various operation switching instructions from the integrating part 311, etc. The robot operation information includes the gripping plan generated by the gripping plan generator 313, the placement plan generated by the placement plan generator 314, and the motion plan generated by the motion plan generator 315.

The hand controller 150 functions as a characteristic information acquisition part 151, a contact information generator 152, a grip state estimation part 153, a stability estimation part 154, a completion determination part 155, and a motion controller 156.

The characteristic information acquisition part 151 receives, from the measurement information processor 312, characteristic information indicating mechanical characteristics of the object to be gripped. The characteristic information includes at least one of the size or the weight of the object. For example, the characteristic information includes shape information, weight, size, etc. The shape information is generated by the measurement information processor 312. The weight and the size are acquired from the object DB 317.

The contact information generator 152 receives detected values indicating the pressure of each of the multiple pads 111 from the multiple negative pressure sensors 111*a*. The pressure of each pad 111 indicates the location at which the hand 100 contacts the object, the direction of the contact, etc. The magnitude of the pressure indicates the strength of the contact. When receiving the detected values from the multiple pads 111, the contact information generator 152 generates (calculates) contact information indicating the contact state of the hand 100 on the object. The contact information includes the contact location of the hand 100 with the object, the direction of the contact on the object, the strength of the contact, etc.

Or, the contact information generator 152 may receive a detected value from the force sensor 220. The force sensor 220 can detect the direction of the force received by the distal end of the arm 200, the magnitude of the force, etc. Therefore, the data that is detected by the force sensor 220 indicates the contact location with the object of the hand 100, the direction of the contact on the object, the strength of the contact, etc. When receiving the detected value from the force sensor 220, the contact information generator 152 calculates contact information.

The grip state estimation part 153 estimates the current grip state based on the grip position and grip posture generated by the gripping plan generator 313 and the contact information acquired by the contact information generator 152. The grip state includes the relative position and posture of the hand 100 for the object to be gripped, mechanical information, etc. The mechanical information includes forces and moments acting between the hand 100 and the object.

The stability estimation part 154 estimates the stability of the current gripping based on the grip state estimated by the grip state estimation part 153 and the characteristic information acquired by the characteristic information acquisition part 151. The stability refers to the stability of the gripping. For example, the stability is calculated to be higher as the likelihood decreases that the object will fall when the object is gripped and transferred in the current state.

The completion determination part 155 determines whether or not the hand 100 has completed the gripping motion of the object to be gripped based on the stability estimated by the stability estimation part 154. Specifically, the completion determination part 155 determines that the gripping is completed when the stability exceeds a preset first threshold. The completion determination part 155 determines that the gripping is not completed when the stability is not more than the first threshold or when the stability is not estimated.

When the gripping is determined to be completed, the completion determination part 155 notifies the completion of the gripping motion to the arm controller 250 and the robot controller 300. When receiving the notification, the robot controller 300 causes the handling robot 10 to perform the next operation such as the lifting operation of the object, etc.

The motion controller 156 performs a first control or a second control based on the estimation result of the stability by the stability estimation part 154. In the first control, the motion controller 156 causes the driver 120 to perform a first motion to increase the stability. In the second control, the motion controller 156 causes the driver 120 to perform a preset second motion.

More specifically, in the first control, the motion controller 156 causes the driver 120 to perform the first motion when the estimated stability is not more than the preset first threshold. Examples of cases where the stability is not more than the first threshold include when the hand 100 is tilted with respect to the object when contacting, when the contact area of the hand 100 with the object is small, etc.

When the stability is not estimated, the motion controller 156 performs the second control. Examples of cases where the stability is not estimated include when the hand 100 does not contact the object even though the hand 100 has moved to the grip position.

Figure 4:
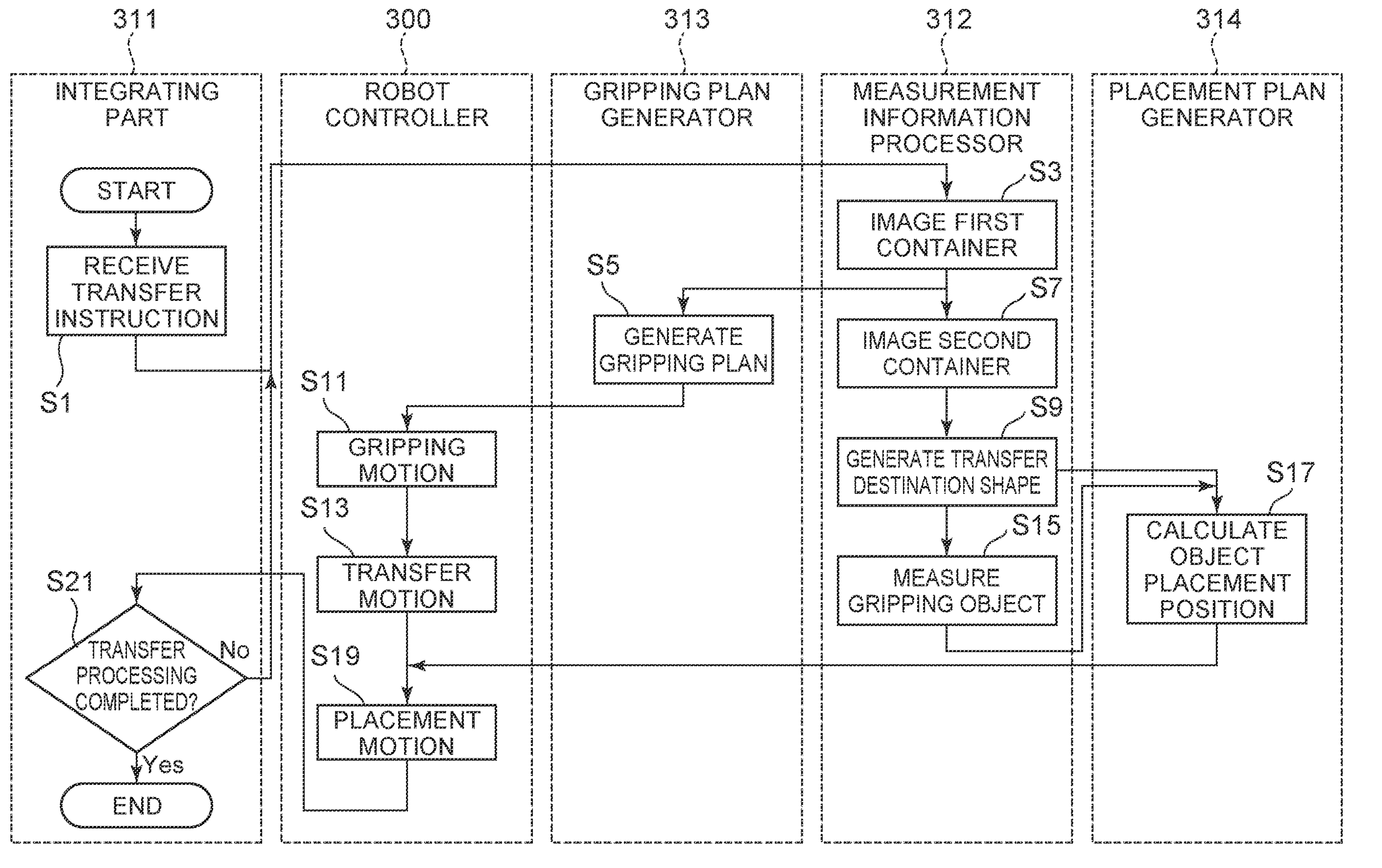
FIG. 4 shows a processing procedure of the handling system when gripping the object.

FIG. 4 shows a processing procedure of the handling system when gripping the object.

The integrating part 311 receives a transfer instruction from the external I/F 316 (step S1). The integrating part 311 instructs the measurement information processor 312 to image the first container C1. The measurement information processor 312 causes the sensor 21 to image the first container C1 (step S3). After imaging the first container C1, the gripping plan generator 313 generates a gripping plan including the grip position and the like (step S5).

The measurement information processor 312 causes the sensor 22 to image the second container C2 (step S7). The measurement information processor 312 generates a transfer destination shape based on the imaging result of the second container C2 (step S9). The transfer destination shape includes the shapes of the second container C2 and the objects housed in the second container C2.

When the generation of the gripping plan in step S5 is completed, the robot controller 300 performs a gripping motion according to the gripping plan (step S11). After completing the gripping motion, the robot controller 300 performs a transfer motion (step S13). In the transfer motion, the gripped object is lifted and transferred to the second container C2. The measurement information processor 312 causes the sensor 23 to measure the gripped object partway through the transfer motion (step S15).

After completing the measurement, the placement plan generator 314 calculates the placement position of the object to be transferred based on the generation result of the transfer destination shape and the measurement result of the object (step S17). Based on the calculated placement position, the robot controller 300 causes the hand 100 and the arm 200 to perform a placement motion (step S19).

The integrating part 311 determines whether or not the instructed handling processing is completed (step S21). For example, when multiple objects of the same type are transferred from the first container C1 to the second container C2, the integrating part 311 determines whether or not a designated number of objects has been transferred. When the handling processing is not completed, the integrating part 311 re-instructs the measurement information processor 312 to image the first container C1. When the handling processing is completed, the integrating part 311 ends the handling processing.

Figure 5:
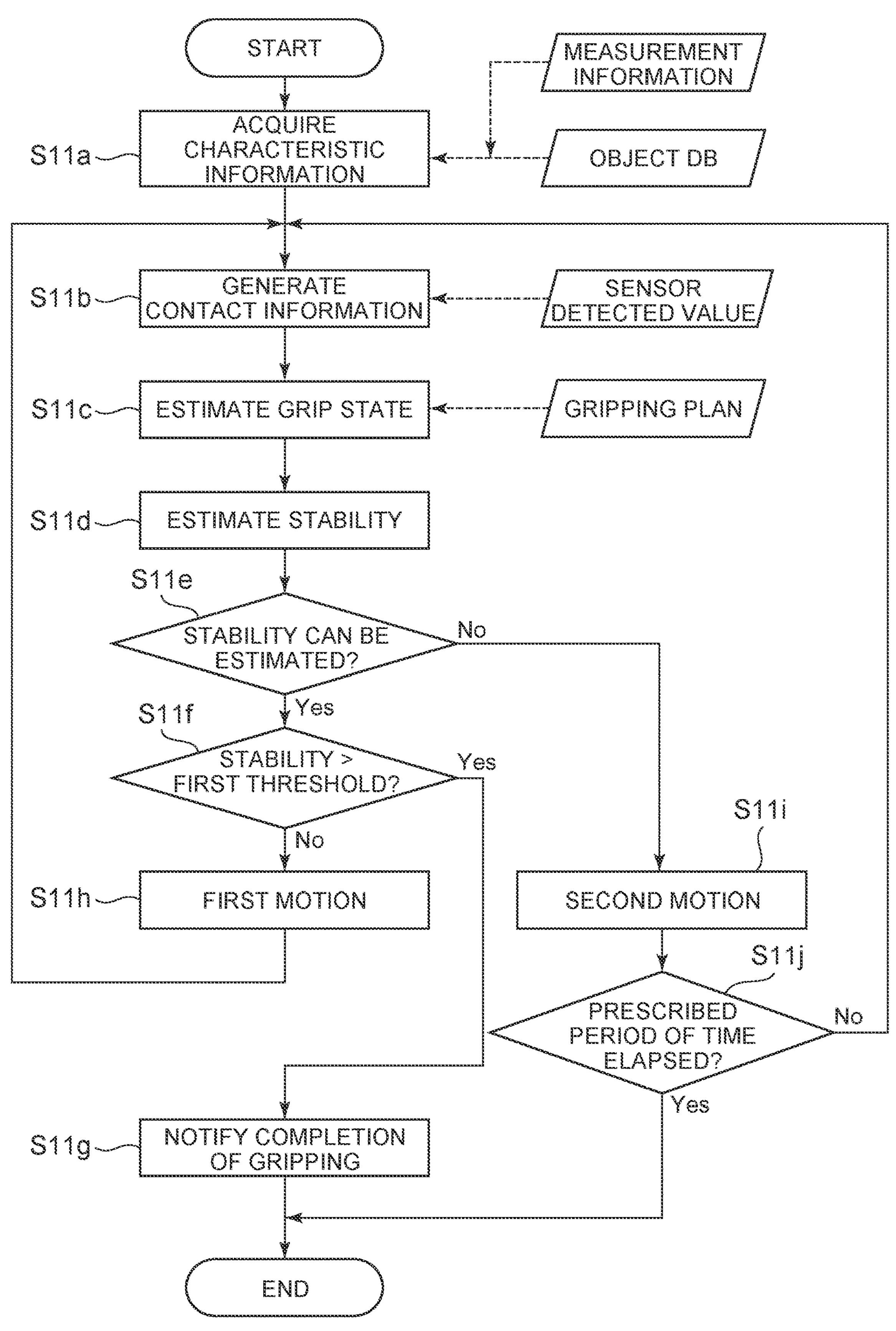
FIG. 5 shows a processing procedure of a hand controller.

FIG. 5 shows a processing procedure of the hand controller.

In step S11 shown in FIG. 4, the hand controller 150 performs the processing shown in FIG. 5. First, the characteristic information acquisition part 151 of the hand controller 150 acquires characteristic information of the object from the measurement information processor 312 (step S11*a*). The characteristic information includes the shape information calculated by the measurement information processor 312, the weight and size of the object obtained from the object DB 317, etc.

The contact information generator 152 acquires a detected value indicating the contact state of the hand 100 on the object from a sensor included in the hand 100 or from an external sensor. The contact information generator 152 generates contact information of the hand 100 for the object from the detected value of the sensor (step S11*b*). The grip state estimation part 153 estimates the grip state based on the result of the gripping plan generator 313 (step S11*c*).

The stability estimation part 154 estimates the stability of the gripping based on the estimated grip state and the contact information (step S11*d*). The completion determination part 155 determines whether or not the stability can be estimated and whether or not the stability is estimated (step S11*e*). When the stability is estimated, the completion determination part 155 determines whether or not the stability exceeds the first threshold (step S11*f*). When the stability exceeds the first threshold, the completion determination part 155 notifies the arm controller 250 and the robot controller 300 that the gripping is completed (step S11*g*).

When the stability is not more than the first threshold, the motion controller 156 causes the driver 120 to perform the first motion to increase the stability (step S11*h*). Specifically, the motion controller 156 calculates the drive amount of the driver 120 necessary to increase the stability. The motion controller 156 operates the driver 120 according to the drive amount. When the hand 100 shown in FIG. 2 is used, the motion controller 156 calculates the rotation angle of the rotation axis 122 necessary to increase the stability. The motion controller 156 rotates the rotation axis 122 not less than the calculated rotation angle.

When the stability cannot be estimated and the stability is not estimated, the motion controller 156 causes the driver 120 to perform the preset second motion (step S11*i*). Specifically, first, the motion controller 156 calculates the drive amount of the driver 120 in the second motion. Then, the motion controller 156 causes the driver 120 to perform the second motion according to the drive amount.

While performing the second motion, the motion controller 156 determines whether or not a prescribed period of time has elapsed from the start of the second motion (step S11*j*). When the prescribed period of time has not elapsed, the generation of the contact information, the estimation of the grip state, the calculation of the stability, etc., are repeated. When the stability is estimated while the second motion is being performed, the second motion is stopped, and step S11*f* is performed.

Figure 6:
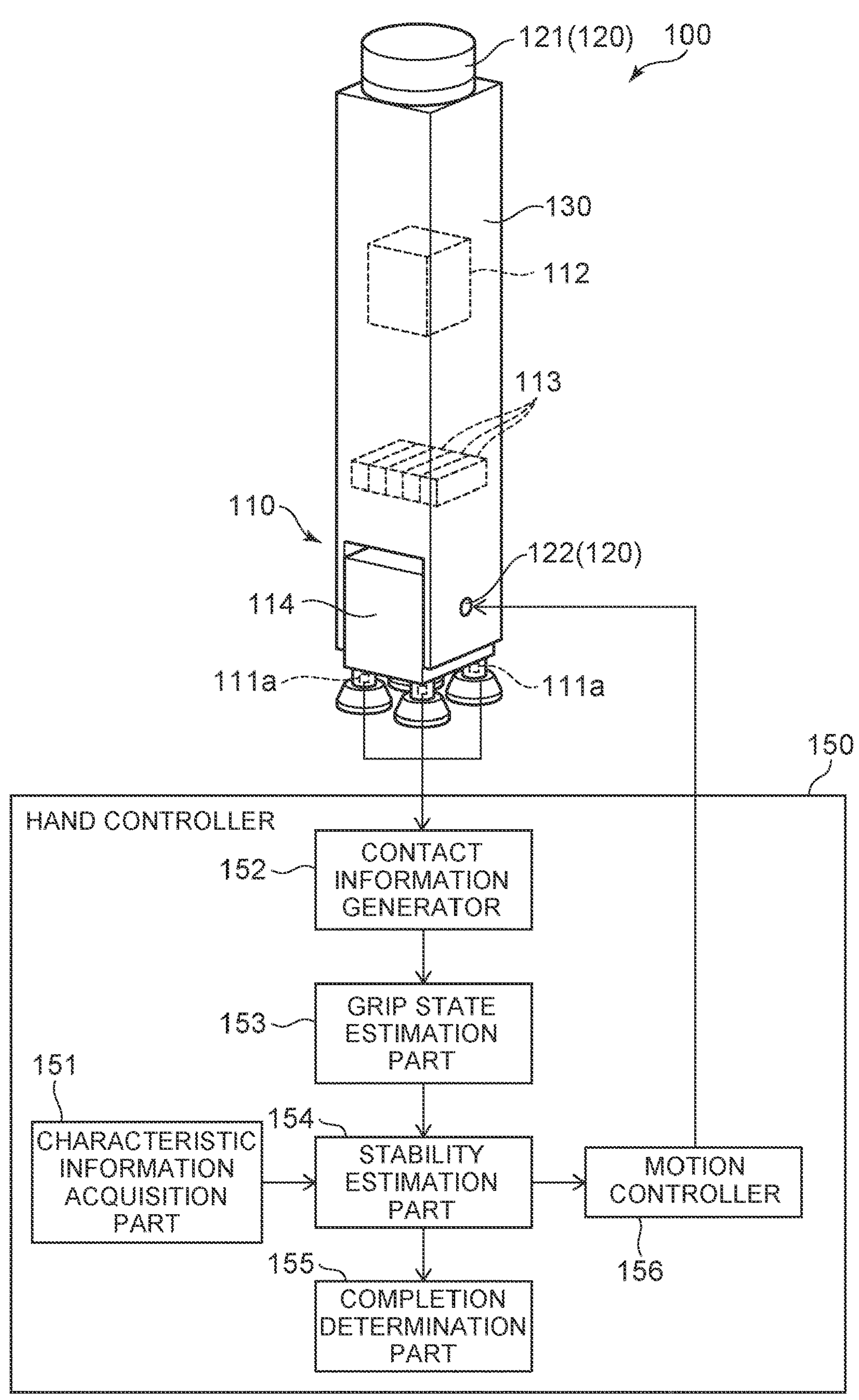
FIG. 6 is a schematic view showing an example of the hand according to the first embodiment.

FIG. 6 is a schematic view showing an example of the hand according to the first embodiment.

As shown in FIG. 6, the contact information generator 152 of the hand controller 150 acquires the detected values from the multiple negative pressure sensors 111*a* of the gripper 110. The contact information generator 152 generates contact information based on the detected values of the negative pressure sensors 111*a*. The contact information is used to estimate the stability. The motion controller 156 causes the driver 120 to move the rotation axis 122 based on the estimated stability. The motion controller 156 also may move the rotation axis 121 of the driver 120.

An example of specific processing by the controllers according to the first embodiment will now be described.

The measurement information processor 312 of the robot controller 300 generates three-dimensional shape information of the object to be gripped based on the information obtained by the sensor 21. The shape information includes shape information of the upper surface of the object. The upper surface refers to the surface (the region) of the object that faces upward. The measurement information processor 312 transmits the shape information to the characteristic information acquisition part 151 via the integrating part 311.

The integrating part 311 acquires the weight and the size (the width, depth, and height) of the object from the object DB 317. The integrating part 311 transmits this information to the characteristic information acquisition part 151. When the orientation at which the object is placed is unknown, the shape information of the upper surface is compared with the size information. Among the size information, the length of the side that is not included in the upper surface shape is treated as the height of the object. Examples when the orientation of the placed object is unknown include states in which the objects are stacked in bulk, etc.

The contact information generator 152 generates contact information of each pad 111 for the object based on the detected value of the negative pressure sensor 111*a*. The contact information indicates the state of the suction-gripping of each pad 111 with the object. When the pad 111 has insufficient contact with the object to be gripped, when the unevenness of the object surface in the contact region is large, etc., air flows through the pad 111 during suction. In other words, the pressure inside the pad 111 does not decrease. When the pad 111 has sufficient suction to the object, the decrease of the pressure inside the pad 111 is detected. The contact information generator 152 generates the contact information of each pad 111 for the object based on the detected value of each negative pressure sensor 111*a*.

The grip state estimation part 153 estimates the current grip state based on the contact information that is acquired by the contact information generator 152 and indicates which pad is in contact, and based on the grip position generated by the gripping plan generator 313.

Figure 7A:
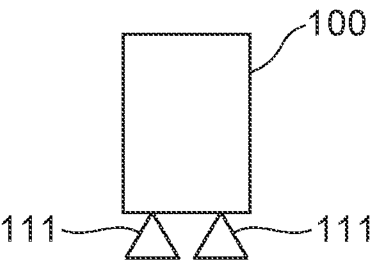
FIGS. 7A to 7C are schematic side views illustrating the contact state and the grip state.
Figure 7A:
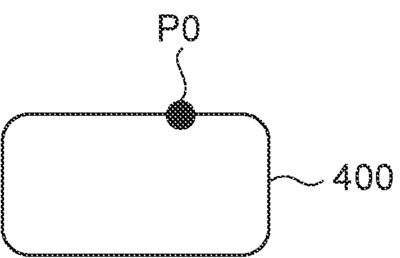
Figure 7B:
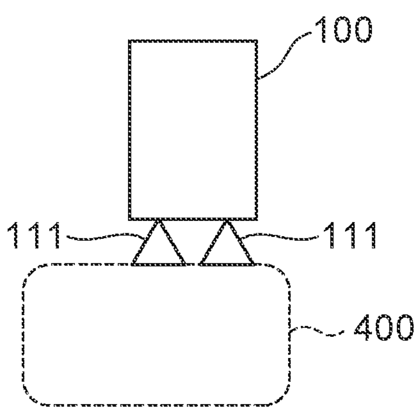
Figure 7C:
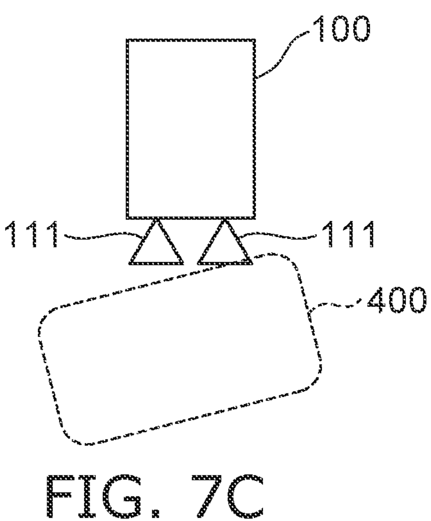

FIGS. 7A to 7C are schematic side views illustrating the contact state and the grip state.

In the example shown in FIG. 7A, a rectangular parallelepiped object 400 is transferred. The gripping plan generator 313 calculates the grip state when gripping the object 400. The grip state includes a grip position P0 when gripping the object 400 and the posture of the hand 100 at the grip position P0.

An example in which there is no error and all of the pads 111 of the hand 100 contact the surface of the object 400 will now be described. Errors occur due to errors of the upper surface shape of the object 400 measured by the sensor 21, errors of the movement amount of the hand 100 or the arm 200, changes of the position or posture of the object 400 after the measurement by the sensor 21, etc.

When all of the pads 111 contact the surface of the object 400, the internal pressure decreases in all of the pads 111. Based on the pressure drop, the contact of all of the pads 111 with the object 400 is detected. Because all of the pads 111 contact the object 400, it is estimated that the surface of the object 400 is parallel to the gripping surface formed by all of the pads 111. As a result, the relative position and posture of the hand 100 with respect to the object 400 is estimated to be the state shown in FIG. 7B. In addition to the position and posture of the hand 100, the force and moment acting between the hand 100 and the object 400 in the state shown in FIG. 7B, etc., are estimated as the grip state.

On the other hand, when only a portion of the pads 111 contacts the surface of the object 400, the internal pressure decreases in the portion of the pads 111; and the internal pressure does not decrease in the other pads 111. Only a portion of the pads 111 is detected to be in contact with the object 400. The relative position and posture of the hand 100 with respect to the object 400 are estimated to be the state shown in FIG. 7C based on the positions of the pads 111 in contact and the position of the object 400. The forces and moments acting between the hand 100 and the object 400 in the state shown in FIG. 7C, etc., are estimated as the grip state.

The stability estimation part 154 calculates the stability of the gripping based on the estimated grip state. The stability is an indicator of how unlikely the object is to fall while transferring the object. As an example, the stability is represented as the ratio of the grip force of the hand 100 with the object to the grip force necessary to grip and transfer the object. As another example, the suction-gripping force on the object is calculated based on the number of the pads 111 that are suction-gripping. The stability is calculated by dividing the suction-gripping force by the weight.

Figure 8A:
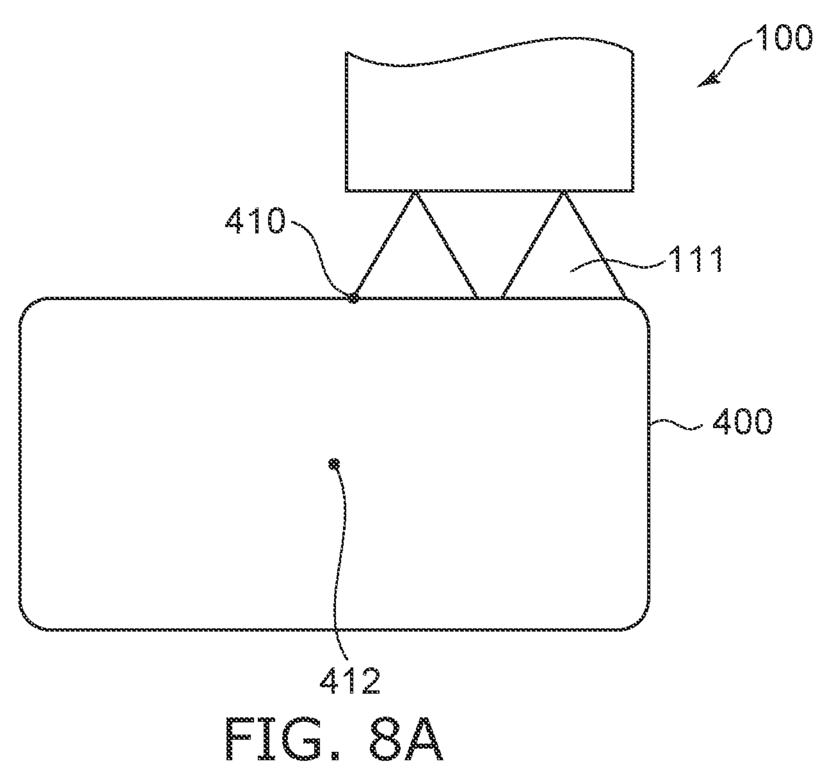
FIGS. 8A and 8B are a schematic side view and a schematic plan view for describing the method for calculating the stability.
Figure 8B:
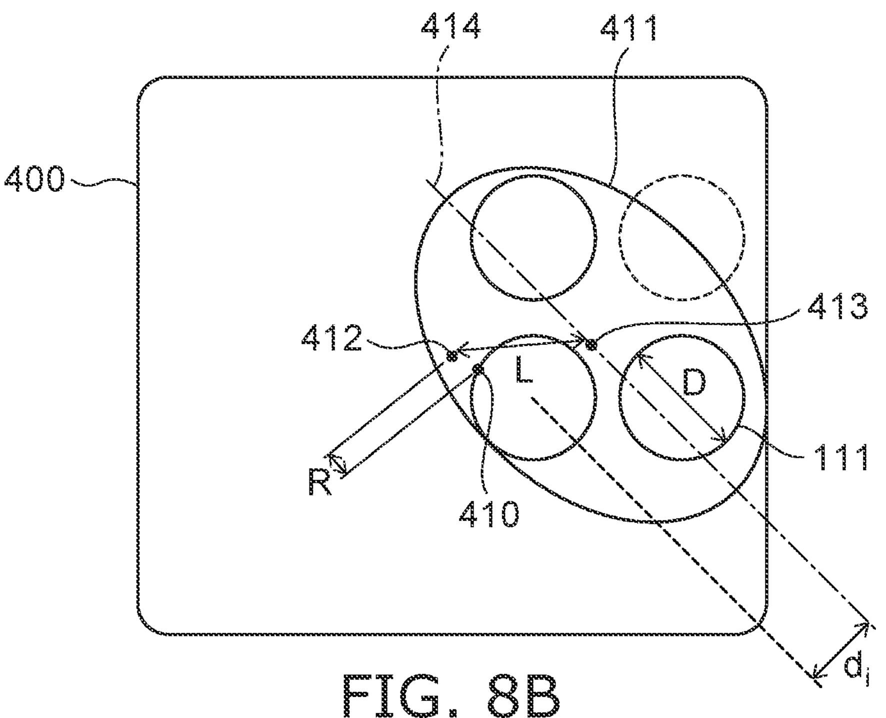

FIGS. 8A and 8B are a schematic side view and a schematic plan view for describing the method for calculating the stability. In FIG. 8B, the pads 111 that are suction-gripping the object 400 are illustrated by solid lines, and the pad 111 that is not suction-gripping the object 400 is illustrated by a broken line.

An example of a specific method for calculating the stability will now be described. The stability of the hand 100 is calculated by the following Formula (1).

$$\rho = \frac{P_c}{\sigma_n + \sigma_b} \qquad \text{[Formula 1]}$$

In Formula (1), $\rho$ is the stability of the gripping. $P_c$ is the pressure of the pad 111 at a critical location 410. $\sigma_n$ is the normal stress. $\sigma_b$ is the bending stress acting at the critical location 410. The critical location 410 is the point at which the bending stress generated by gravity acting on the object 400 has a maximum. The critical location 410 is the point most proximate to a center of gravity 412 of the object inside a suction-gripping region 411 in which the suction-gripping force acts. The center of gravity can be taken to be positioned at the center of the object for simplicity, and is calculated using the shape information and the size. The center of gravity may be pre-calculated by the measurement information processor 312; and the center of gravity may be included in the characteristic information. The normal stress $\sigma_n$ acts in the direction in which the pad 111 is pulled, and is represented by the following Formula (2).

$$\sigma_n = \frac{mg}{A} \quad \text{[Formula 2]}$$

In Formula (2), m is the mass of the object. g is the acceleration due to gravity. A is the total area of the suction-gripping region 411. The pads 111 are assumed to be circular. A is represented by the following Formula (3), wherein D is the pad diameter, and n is the number of the pads 111 that are suction-gripping the object.

$$A = \frac{\pi n D^2}{4} \quad \text{[Formula 3]}$$

The bending stress $\sigma_b$ that acts on the critical location 410 is represented by the following Formula (4).

$$\sigma_b = \frac{MR}{I} \quad \text{[Formula 4]}$$

In Formula (4), M is the bending moment. R is the distance between the critical location 410 and the center of gravity 412. I is the second area moment of the pads 111 that are suction-gripping. L is the distance between the center of gravity 412 of the object and a centroid 413 of the region in which the suction-gripping force acts. The bending moment M is represented by the following Formula (5).

$$M=mgL \quad \text{[Formula 5]}$$

A rotation axis 414 is determined to calculate a second area moment I. The rotation axis 414 is determined based on the arrangement pattern of the suction-gripping pads 111 to be the direction (the major-axis direction) orthogonal to the direction of minimum spread. A second area moment $I_c$ around the center of a circular pad 111 is represented by the following Formula (6).

$$I_c = \frac{\pi D^4}{64} \quad \text{[Formula 6]}$$

$d_i$ is the distance between the rotation axis 414 and the center of the ith pad 111 for each of the pads 111 that are suction-gripping. A second area moment $I_i$ of each pad 111 is represented by the following Formula (7).

$$I_i = I_c + \frac{\pi D^2}{4} d_i^2 \quad \text{[Formula 7]}$$

When multiple pads 111 are suction-gripping, the sum total I of the second area moment is represented by the following Formula (8) using the second area moment $I_i$ of each pad 111. Q means the set of the indexes of the pads 111 that are suction-gripping.

$$I = \sum_{i \in Q} I_i \quad \text{[Formula 8]}$$

The stability estimation part 154 calculates the stability $\rho$ according to Formulas (1) to (8) described above. The completion determination part 155 determines whether or not the gripping motion is completed based on the stability. For example, a threshold $\rho_{th}$ for the stability is preset. The completion determination part 155 determines that the gripping is completed when the calculated stability $\rho$ exceeds the threshold $\rho_{th}$.

FIGS. 9A and 9B are schematic views showing a motion of the hand in the first control. FIG. 9C is a schematic view showing the relationship between the stability and the operation of the driver.

The motion controller 156 operates the driver 120 based on the stability and the grip state estimated by the grip state estimation part 153. The driver 120 includes the rotation axis 122 that can modify the tilt of the gripping surface of the hand 100. For example, as shown in FIG. 9A, only a portion of the pads 111 contacts the object 400. The grip state that is estimated by the grip state estimation part 153 is tilted with respect to the target grip state. In such a case, it can be predicted that the number of the pads 111 that are suction-gripping the object 400 can be increased by tilting the gripping surface by moving the rotation axis 122 as shown in FIG. 9B. The bending stress $\sigma_b$ that acts on the critical location is reduced because the region in which the suction-gripping force acts is increased and the second area moment I is increased. As a result, the stability $\rho$ is predicted to increase. The motion controller 156 moves the rotation axis 122 to increase the stability $\rho$ according to the prediction result. As a result, the grip state of the hand 100 approaches the grip state pre-generated by the gripping plan generator 313.

A relational expression between the stability and the angle of the rotation axis 122 is used in the prediction. Relational expressions are prepared beforehand for each combination of the pads 111 that are suction-gripping. As shown in FIGS. 2 and 6, there are sixteen combinations when the hand 100 including four pads 111 is used. The sixteen relational expressions are prepared beforehand. FIG. 9C is an example of a relational expression when only two pads 111 among the four pads 111 are suction-gripping the object. The horizontal axis is a rotation angle $\phi$ with respect to a reference angle of the rotation axis 122. The vertical axis is the stability $\rho$. As shown in FIG. 9C, the stability changes as the rotation axis 122 rotates and the number of the pads 111 that are suction-gripping the object change. For example, the motion controller 156 fits an estimated stability $\rho_1$ and a current angle $\phi_1$ to the relational expression to determine which direction to change the angle $\phi$ to increase the stability $\rho$. The motion controller 156 calculates an angle $\phi_2$ of the rotation axis 122 so that the stability $\rho$ becomes the threshold $\rho_{th}$ or more. The motion controller 156 rotates the rotation axis 122 to this angle.

When the operation of the driver 120 is completed, the contact information generator 152 reacquires the detected values from the multiple negative pressure sensors 111*a* and generates the contact information. The grip state estimation part 153 uses the contact information to re-estimate the grip state. The stability estimation part 154 recalculates the stability based on the grip state. The operation described above is repeated until the stability exceeds the threshold $\rho_{th}$.

Figure 10A:
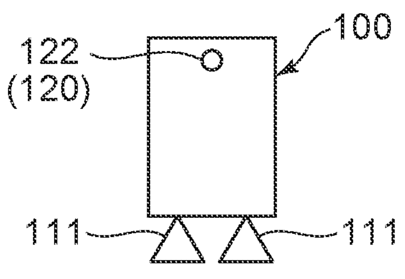
FIGS. 10A to 10D are schematic views showing a motion of the hand in the second control.
Figure 10A:
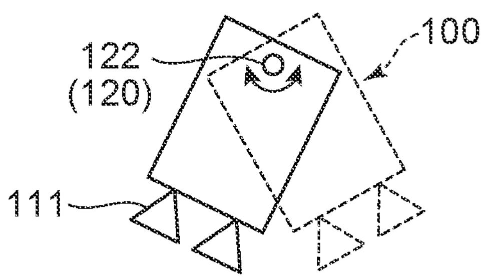
Figure 10A:
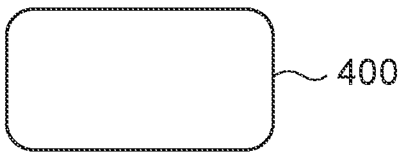
Figure 10B:
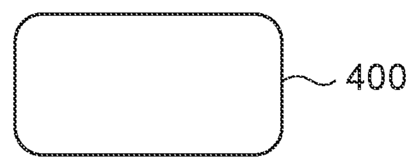
Figure 10C:
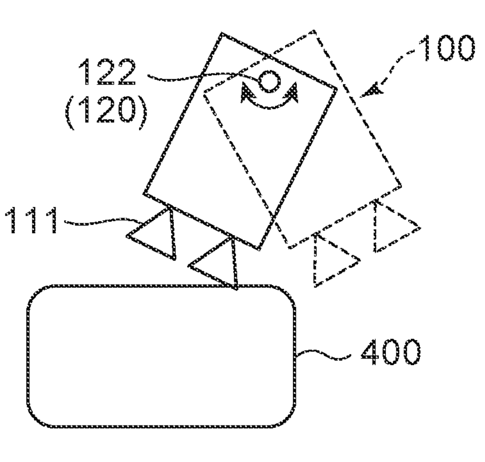

FIGS. 10A to 10C are schematic views showing a motion of the hand in the second control.

When contact of the pads 111 is not detected even when the hand 100 reaches the grip position as shown in FIG. 10A, the target grip state and the current grip state are determined to be different. In such a case, the position of the object 400 with respect to the gripper 110 is unclear. It cannot be estimated how the driver 120 should be moved to approach the target grip state. Therefore, in the second control, the driver 120 is caused to perform a preset second motion. A specific motion pattern that causes the gripper 110 to search for the object is set as the second motion.

Figure 10D:
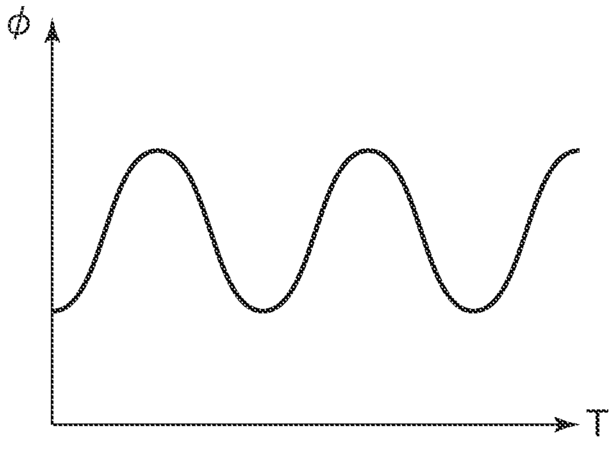

For example, as shown in FIG. 10D, the motion controller 156 calculates the drive amount of the driver 120 in the second motion. In FIG. 10D, the horizontal axis is a time T. The vertical axis is the rotation angle $\phi$ of the rotation axis 122. In the example shown in FIG. 10D, the rotation angle $\phi$ changes periodically within a certain range. By periodically changing the rotation angle $\phi$, the gripper 110 pivots as shown in FIG. 10B. The hand 100 is lowered by the arm 200 as shown in FIG. 10C during the motion of the gripper 110. The second motion is performed so that the hand 100 approaches the target grip state in an exploratory manner.

When the object 400 is proximate to the hand 100, the hand 100 contacts the object 400 in the second motion. The contact of the hand 100 with the object 400 is detected based on the detected value of the negative pressure sensor 111*a*. The grip state estimation part 153 uses the contact information indicating contact of the hand 100 with the object 400 to estimate the grip state. The stability estimation part 154 estimates the stability based on the grip state. As a result, the second control ends and the first control is performed as appropriate.

A time limit or a limit of the position of the arm 200 is set in the second control. The second control ends when such a limit is reached, or when contact of one of the pads 111 with the object 400 is detected. When the limit is reached without detecting contact with the object 400, the hand controller 150 and the arm controller 250 stop the motion of the hand 100 and the arm 200. The hand controller 150 may emit a notification of the abnormality.

Advantages of the first embodiment will now be described.

A gripping plan that includes the grip position, the grip posture, etc., is generated when the object is to be gripped by the hand 100. The information that is acquired by the sensor 21 is used to generate the gripping plan. Specifically, a three-dimensional shape of the object to be gripped is calculated based on the information of the sensor 21; and the gripping plan is generated based on the three-dimensional shape.

The three-dimensional shape calculated using the data of the sensor 21 may include errors. When the errors are large, the hand 100 cannot appropriately grip the object. For example, the grip force (the suction-gripping force) of the hand 100 with the object is insufficient, or the hand 100 cannot contact the object.

For this problem, a method may be considered in which a sensor is provided in the hand 100 which can be more proximate to the object. However, adding a sensor to the hand 100 would make the hand 100 larger. The hand 100 would be more likely to interfere with another object when gripping the object. Also, the weight of the hand 100 would be increased so that a greater drive force would be necessary to move the hand 100. The handling robot 10 may be larger as a result.

For this problem, the hand controller 150 performs the first control in the hand 100 according to the first embodiment. The hand controller 150 performs the first control when the stability of the gripping of the object by the hand 100 is estimated. In the first control, the hand controller 150 causes the driver 120 to perform the first motion to increase the stability.

According to the first control, the stability of the gripping is increased. Even when the grip force of the hand 100 with the object is insufficient, the grip force is increased to increase the stability. According to the first control, the object can be gripped more stably. The gripped object can be transferred more stably.

Favorably, the hand controller 150 further performs the second control. The hand controller 150 performs the second control when the stability is not estimated. In the second control, the hand controller 150 causes the driver 120 to perform the preset second motion.

According to the second control, the hand 100 can be caused to contact the object. The contact information can be obtained if the hand 100 contacts the object. The grip position can be corrected based on the drive amount of the rotation axis 122 from the grip position. The grip state estimation part 153 estimates the grip state based on the contact information and the corrected grip position. The stability estimation part 154 calculates the stability based on the estimated grip state. The hand 100 can grip the object even when the stability is not estimated even though the hand 100 has reached the grip position. According to the second control, cases where the hand 100 cannot grip the object can be suppressed, and the reliability of the gripping can be increased.

As shown in Formulas (1) to (8), the stability has a relationship with the weight, size, and the like of the object. For example, even when objects of the same size are gripped at the same grip position, the stability changes according to the weight of the object. As a result, heavy objects require more time for the first control than light objects. The transfer starts after the stability is sufficiently high. Compared to heavy objects, the stability exceeds the first threshold more easily for light objects. Compared to heavy objects, the gripping is completed and the transfer is started more quickly for light objects. By controlling the gripping operation according to the stability, the gripping of the objects can be more stable and can be completed more quickly according to the characteristics of the objects. In other words, the time necessary for transfer (the takt time) can be reduced while suppressing degradation of the gripping stability.

As an example of an operation according to the first embodiment, when the hand 100 moves to the grip position and contacts an object, the hand 100 or the arm 200 is moved to increase the grip force on the object by the hand 100. For example, when only a portion of the multiple pads 111 suction-grips the object, the posture of the hand 100 is changed so that more pads 111 suction-grip the object. When the hand 100 moves to the grip position but does not contact the object, the hand 100 is moved according to a preset motion pattern.

The motion pattern ends when the hand 100 contacts an object in the motion pattern. Subsequently, the hand 100 or the arm 200 is moved to increase the grip force on the object by the hand 100. For example, when only a portion of the multiple pads 111 suction-grip the object, the posture of the hand 100 is changed so that more pads 111 suction-grip the object.

According to the operation, the stability of the gripping or the reliability of the gripping can be increased, and the operational reliability of the hand 100, the handling robot 10, or the handling system 1 can be increased.

The first embodiment is applicable not only when gripping a placed object but also after the object is gripped. For example, there are cases where an object deforms and has decreased stability when the object is gripped and lifted. In such a case, the motion controller 156 performs the first control when the stability becomes the first threshold or less. Specifically, the motion controller 156 rotates the rotation axis 122 of the driver 120 to increase the stability. For example, even when some of the suction-gripping pads 111 detach due to the deformation of the object, the operation of the driver 120 causes the pads 111 that detached from the object to suction-grip the object again.

Acceleration acts on the object while transferring the object. There is a possibility that the acceleration may cause a portion of the pads 111 to detach from the object. In such a case, the number of the pads 111 that are suction-gripping the object is reduced, which reduces the area of the suction-gripping region and the stability. In such a case as well, the motion controller 156 performs the first control when the stability becomes the first threshold or less. Specifically, the motion controller 156 rotates the rotation axis 122 of the driver 120. The rotation of the gripper 110 causes the pads 111 that detached from the object to suction-grip the object again.

SECOND EMBODIMENT

Figure 11:
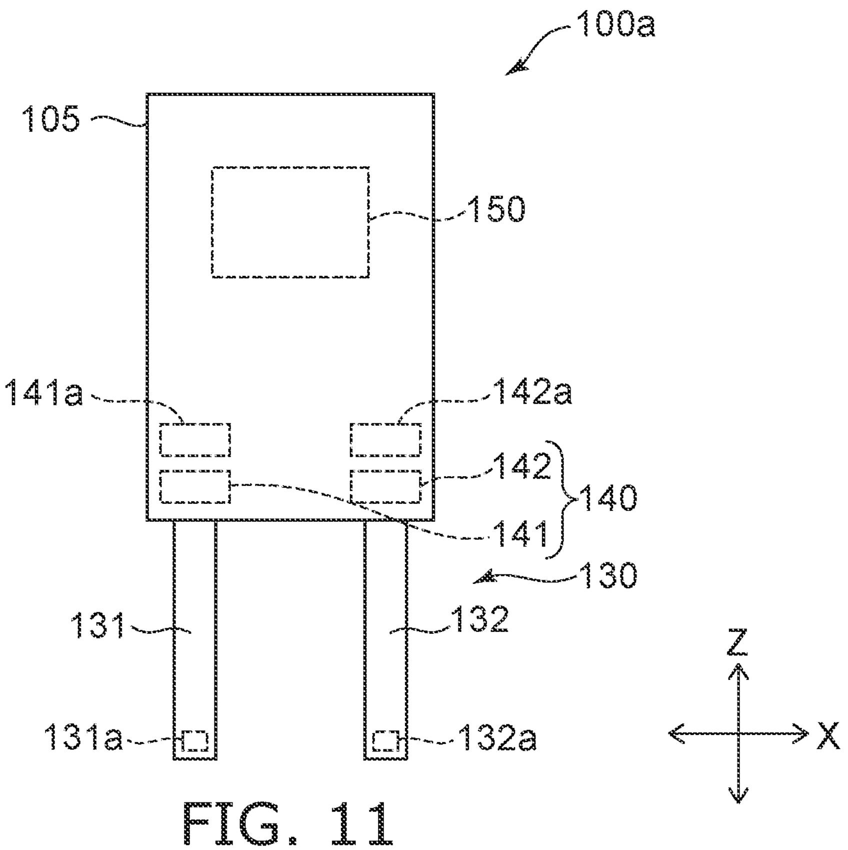
FIG. 11 is a schematic side view showing a hand according to a second embodiment.

FIG. 11 is a schematic side view showing a hand according to a second embodiment.

As shown in FIG. 11, the hand 100*a* according to the second embodiment includes the base 105, a gripper 130, a driver 140, and the hand controller 150. Similarly to the hand 100 according to the first embodiment, the hand 100*a* is mounted to the distal end of the arm 200.

The gripper 130 includes a pinching mechanism. Specifically, the gripper 130 includes a supporter 131 and a supporter 132. In the illustrated example, the supporter 131 and the supporter 132 are plate-shaped or rod-shaped and extend along the Z-direction. Other than the illustrated example, the gripper 130 may have a structure including three or more fingers.

A sensor 131*a* and a sensor 132*a* are located respectively at the distal ends of the supporters 131 and 132. The supporter 131 and the supporter 132 are elastic in the Z-direction. The sensor 131*a* detects the deformation amount when the supporter 131 deforms in the Z-direction. The sensor 132*a* detects the deformation amount when the supporter 132 deforms in the Z-direction. For example, the sensor 131*a* and the sensor 132*a* include linear pulse encoders, force sensors, strain sensors, or laser displacement meters.

The supporter 131 and the supporter 132 are separated from each other in the X-direction. The driver 140 includes an actuator 141 and an actuator 142. The actuator 141 and the actuator 142 respectively drive the supporters 131 and 132 along the X-direction. The distance between the supporter 131 and the supporter 132 is changed by the operations of the actuators 141 and 142. In other words, the supporter 131 and the supporter 132 are opened and closed by the actuators 141 and 142.

The driver 140 includes a sensor 141*a* and a sensor 142*a*. The sensor 141*a* and the sensor 142*a* are provided to detect the grip force due to the supporters 131 and 132. For example, the actuator 141 and the actuator 142 are motors. The sensor 141*a* and the sensor 142*a* detect the current values flowing respectively in the actuators 141 and 142. The currents that flow in the actuators 141 and 142 increase when the reaction forces acting on the supporters 131 and 132 increase. The reaction forces correspond to the forces of the supporters 131 and 132 pinching the object. The grip force due to the supporters 131 and 132 can be detected based on the currents flowing through the actuators 141 and 142.

Figure 12:
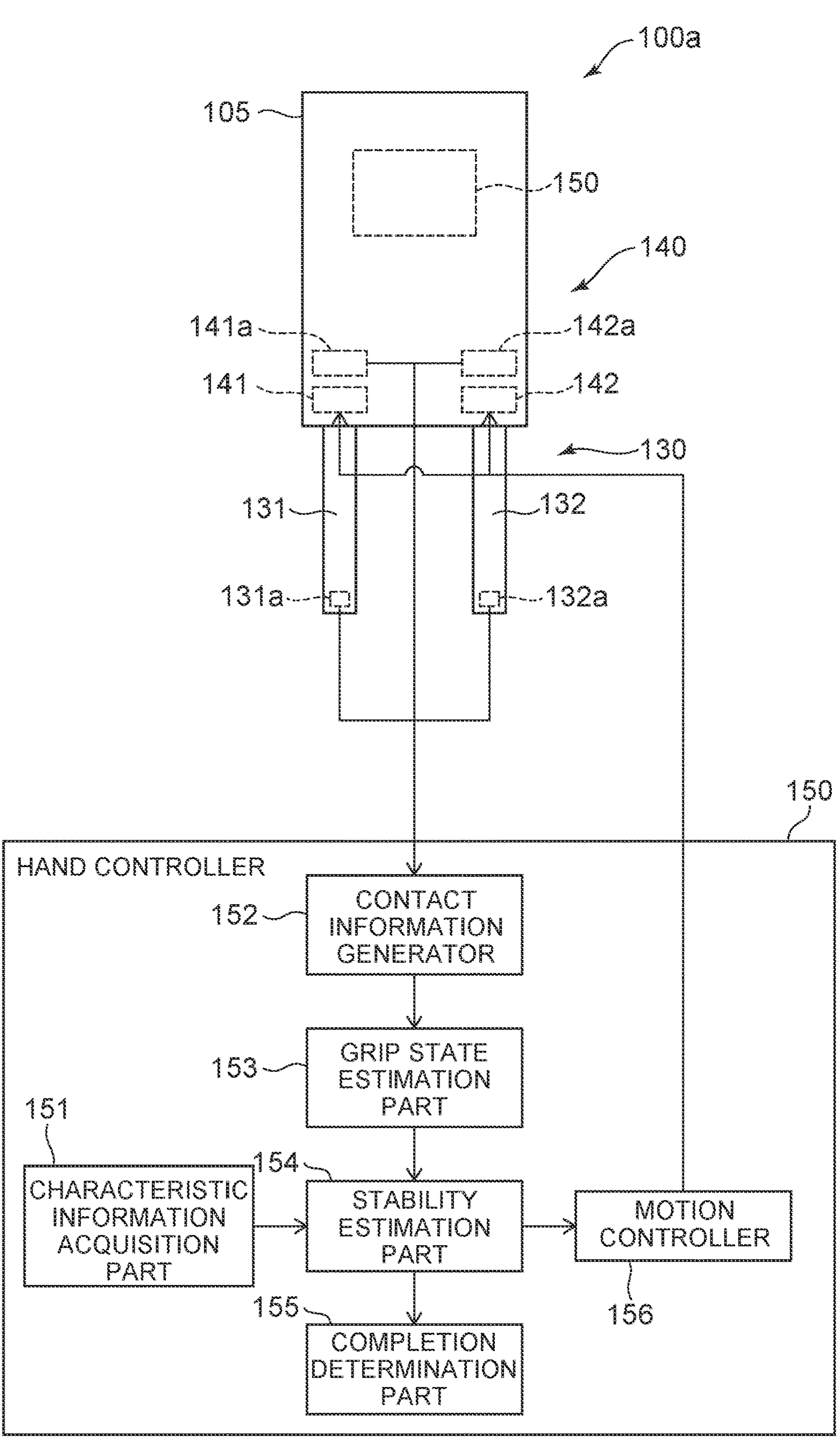
FIG. 12 is a schematic view showing the configuration of the hand according to the second embodiment.

FIG. 12 is a schematic view showing the configuration of the hand according to the second embodiment. FIGS. 13A to 13E are schematic side views illustrating the operation of the hand according to the second embodiment.

Similarly to the first embodiment, the hand controller 150 functions as the characteristic information acquisition part 151, the contact information generator 152, the grip state estimation part 153, the stability estimation part 154, the completion determination part 155, and the motion controller 156.

The characteristic information acquisition part 151 acquires characteristic information of the object to be gripped. The contact information generator 152 of the hand controller 150 acquires detected values from the sensor 131*a*, the sensor 132*a*, the sensor 141*a*, and the sensor 142*a*. The detected values of these sensors indicate the contact of the supporters 131 and 132 with the object and the direction of the contact. The contact information generator 152 generates contact information based on the detected values of the sensors.

Figures 13A, 13B, 13C, 13D, 13E:
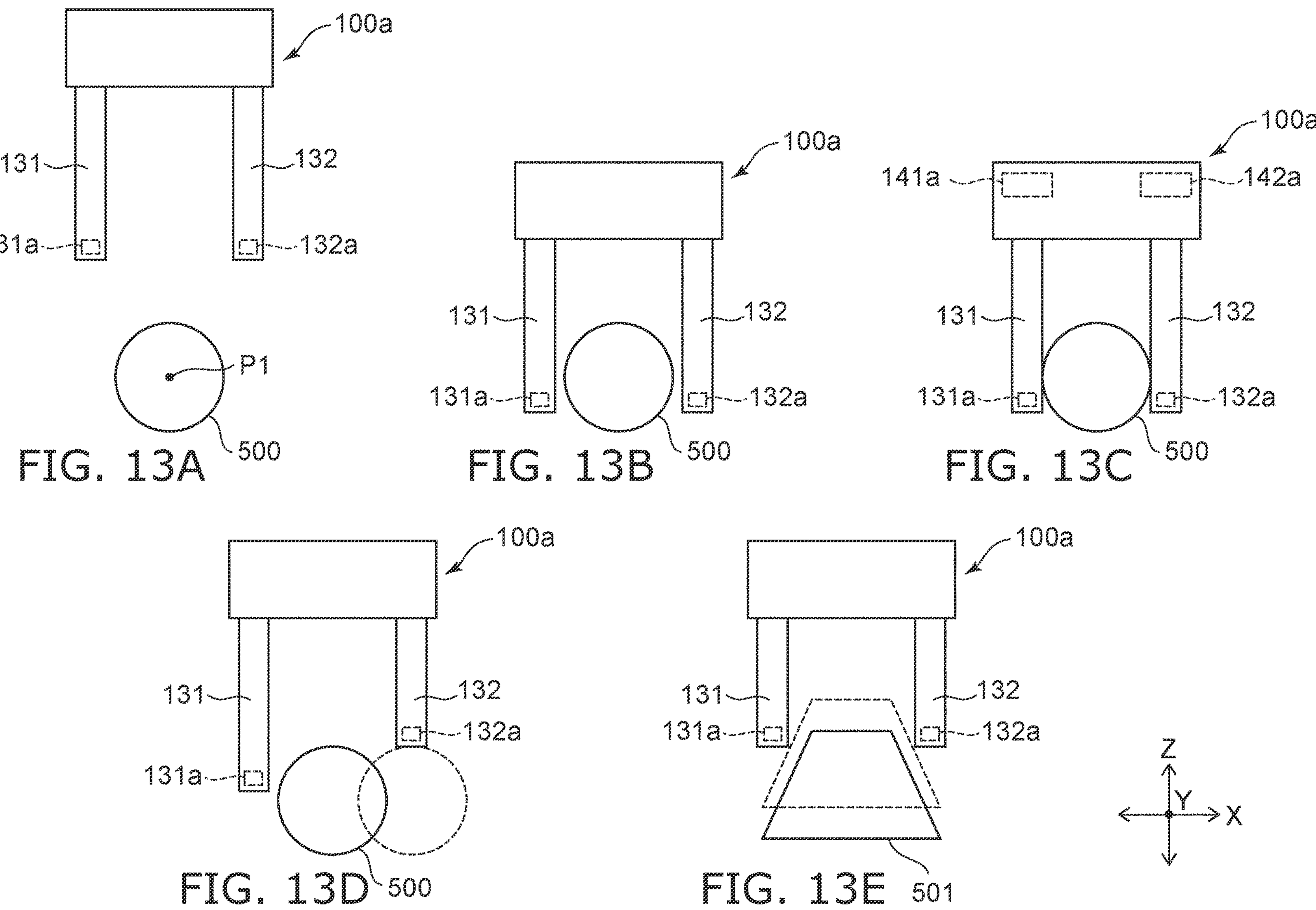
FIGS. 13A to 13E are schematic side views illustrating the operation of the hand according to the second embodiment.

The grip state estimation part 153 estimates the current grip state based on the contact information acquired by the contact information generator 152 and the grip state generated by the gripping plan generator 313. As an example, the hand 100*a* grips an object 500 as shown in FIG. 13A. The object 500 has a cylindrical shape extending in one direction. The supporter 131 and the supporter 132 pinch the object 500 in a direction perpendicular to the direction in which the object 500 extends. A target grip position P1 is set for the object 500.

The arm 200 lowers the hand 100*a* so that the supporters 131 and 132 are positioned at two sides of the object 500. As shown in FIG. 13B, the supporter 131 and the supporter 132 do not contact the object 500 when the error is small. Therefore, the sensor 131*a* and the sensor 132*a* do not detect deformation of the supporters 131 and 132. As shown in FIG. 13C, the supporter 131 and the supporter 132 contact the object 500 when the supporters 131 and 132 are closed. The contact of the supporters 131 and 132 with the object 500 is detected based on the detected values of the sensors 141*a* and 142*a*. Based on the contact information based on the detected values of the sensors, the grip state estimation part 153 estimates that the object 500 is positioned between the supporter 131 and the supporter 132.

In FIGS. 13D and 13E, the position of the object corresponding to the target grip state is illustrated by a solid line. The position of the object corresponding to the estimated grip state is illustrated by a broken line. When the error is large as shown in FIG. 13D, one of the supporter 131 or the supporter 132 may contact the object 500 when the arm 200 lowers the hand 100*a*. In the illustrated example, the sensor 132*a* detects the deformation of the supporter 132. The sensor 131*a* does not detect deformation of the supporter 131. Based on the contact information based on the detected values of the sensors 131*a* and 132*a*, the grip state estimation part 153 estimates that the object 500 is positioned below the supporter 132.

In another example in which the error is large as shown in FIG. 13E, both the supporters 131 and 132 contact an object 501 when the arm 200 lowers the hand 100*a*. The width of the object 501 increases downward. In such a case, the actual position of the object 501 is estimated to be higher than the target grip position.

Figure 14A:
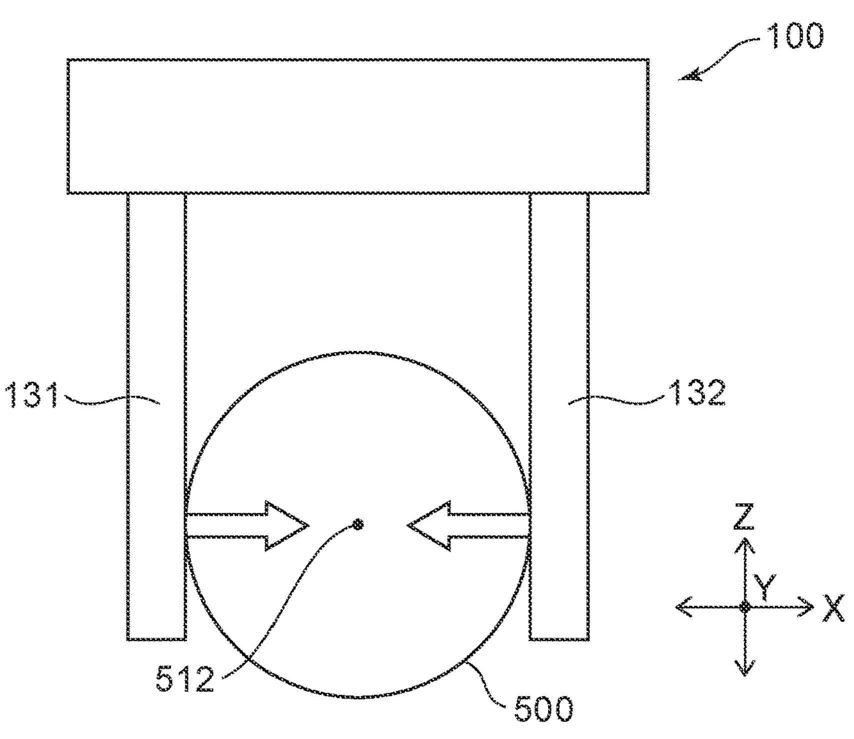
FIGS. 14A and 14B are schematic side views for describing a method for calculating the stability.
Figure 14B:
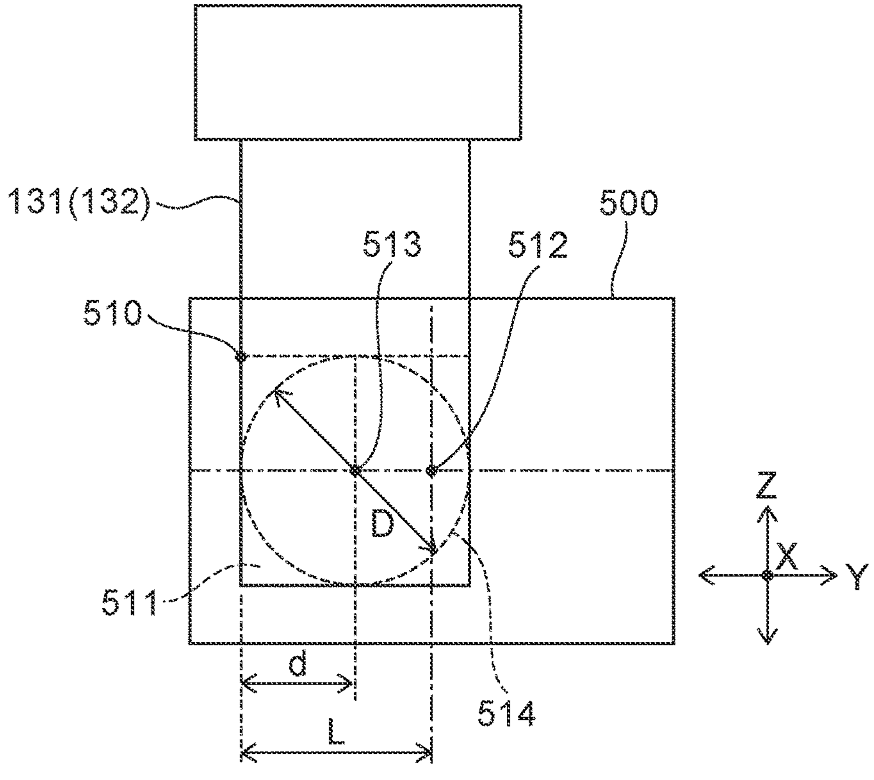

FIGS. 14A and 14B are schematic side views for describing a method for calculating the stability. FIG. 14B shows the state when the supporter 131 and the supporter 132 are viewed along the separation direction.

The stability estimation part 154 estimates the stability of the current gripping based on the grip state estimated by the grip state estimation part 153 and the characteristic information acquired by the characteristic information acquisition part 151. As one specific example as shown in FIGS. 14A and 14B, the supporter 131 and the supporter 132 contact and grip the object 500. In such a case, the gripper 130 has a contact region 511 for the object 500. A grip force F acts on the contact region 511. The stability ρ of the gripping is represented by the following Formula (9).

$$\rho = \frac{F_p}{F_b + \mathrm{mg}} \quad \text{[Formula 9]}$$

$F_p$ is the maximum static friction force when gripping the object 500. $F_b$ is the bending force acting on the object. mg is the force of gravity acting on the object. Because the supporter 131 and the supporter 132 contact the two sides of the object 500, a maximum static friction force $F_p$ is represented by the following Formula (10) using the grip force F and a friction coefficient μ between the object and the gripper.

$$F_p 2\,\mu F \quad \text{[Formula 10]}$$

The bending force $F_b$ that acts on the object is represented by the following Formula (11). T is the bending moment acting on a critical location 510. d is the horizontal distance from a centroid 513 of the contact region 511 to the critical location 510. $I_p$ is the second area polar moment of the contact region.

$$F_b = \frac{Td}{2I_p} \quad \text{[Formula 11]}$$

The critical location 510 is the point at which the bending moment has a maximum in the contact region 511, and is the point most distant to a center of gravity 512 of the object 500. The center of gravity 512 corresponds to the position of the center of gravity of the object 500 in three-dimensional space when projected onto a plane of the contact region 511. The bending moment T that acts on the critical location 510 is represented by the following Formula (12). In Formula (12), L is the horizontal distance between the critical location 510 and the center of gravity 512.

$$T = Lmg \quad \text{[Formula 12]}$$

The second area polar moment $I_p$ of the contact region is represented by the following Formula (13), wherein D is the diameter of a virtual circle 514 approximating the contact region 511. The virtual circle 514 is a circle that has the center of gravity 512 as the center and passes through the critical location 510. The diameter D of the virtual circle 514 corresponds to 2 times the distance between the critical location 510 and the center of gravity 512.

$$I_p = \frac{\pi D^4}{32} \quad \text{[Formula 13]}$$

Based on the stability estimated by the stability estimation part 154, the completion determination part 155 determines whether or not the gripping motion by the hand 100*a* is completed.

Based on the estimation result of the stability, the motion controller 156 performs the first control or second control. In the first control, the motion controller 156 causes the driver 140 to perform the first motion to increase the stability. In the second control, the motion controller 156 causes the driver 140 to perform the preset second motion.

FIGS. 15A and 15B are schematic views showing the motion of the hand in the first control. FIG. 15C is a schematic view showing the relationship between the stability and the operation of the driver.

The driver 140 includes the actuators 141 and 142. The size of the contact region 511 of the gripper 130 with the object 500 and the magnitude of the grip force F can be modified by the operations of the actuators 141 and 142.

For example, the hand 100*a* reaches the target grip position as shown in FIG. 15A. When deformation of the supporters 131 and 132 is not detected by the sensors 131*a* and 132*a*, the grip state estimation part 153 estimates that the target grip state has been realized. As shown in FIG. 15B, the supporter 131 and the supporter 132 contact the object 500 when the supporter 131 and the supporter 132 are closed by the operations of the actuators 141 and 142. The sensor 141*a* and the sensor 142*a* detect the increase of the currents of the actuators 141 and 142. It is estimated that the supporter 131 and the supporter 132 contact the object 500. The stability is estimated using the contact information.

In such a case, the stability can be predicted to be increased by increasing the grip force by further closing the supporters 131 and 132. The relational expression between the stability and the rotation angles of the actuators 141 and 142 is used in the prediction. FIG. 15C is an example of the relational expression. In the example, the actuator 141 and the actuator 142 are motors. The horizontal axis is a rotation angle ψ with respect to the reference angles of the actuators 141 and 142. The vertical axis is the stability ρ. It can be seen that the distance between the supporter 131 and the supporter 132 decreases as the rotation angle ψ increases.

The motion controller 156 determines which direction to change the angle ψ to increase the stability ρ by fitting the estimated stability $\rho_1$ and a current angle $\psi_1$ to the relational expression. The motion controller 156 calculates an angle $\psi_2$ of the actuators 141 and 142 to cause the stability ρ to reach or exceed the threshold $\rho_{th}$. The motion controller 156 rotates the actuators 141 and 142 to this angle.

When the estimated stability exceeds the first threshold, the motion controller 156 may operate the actuators 141 and 142 to increase the distance between the supporter 131 and the supporter 132. The grip force is reduced thereby. For example, a second threshold that is greater than the first threshold is set for the stability. When the stability exceeds the second threshold, the grip force is reduced in a range in which the stability is greater than the first threshold. As a result, deformation or damage of the object can be suppressed while maintaining the stability necessary to grip and transfer.

FIGS. 16A to 16D are schematic views showing the motion of the hand in the second control.

For example, as shown in FIG. 16A, the hand 100*a* reaches the grip position; and the supporter 131 and the supporter 132 are closed. When contact of the gripper 130 with the object 500 is not detected, the target grip state and the current grip state are determined to be different. In such a case, the position of the object 400 with respect to the gripper 130 is unknown, and it cannot be estimated how to move the driver 140 to approach the target grip state. Therefore, in the second control, the driver 140 is caused to perform the preset second motion.

For example, in the second motion as shown in FIGS. 16B to 16D, the motion controller 156 changes the distance between the supporter 131 and the supporter 132 periodically within a certain range. In FIG. 16D, the horizontal axis is the time T. The vertical axis is the rotation angle ψ of the actuators 141 and 142. As shown in FIG. 16C, the hand 100*a* is lowered by the arm 200 in the motion of the gripper 130. The second motion is performed to cause the hand 100*a* to approach the target grip state in an exploratory manner.

The hand 100*a* contacts the object 500 in the second motion when the object 500 is proximate to the hand 100*a*. The contact information generator 152 generates information indicating the contact of the hand 100*a* with the object 500. The grip state estimation part 153 uses the contact information to estimate the grip state. The stability estimation part 154 estimates the stability based on the grip state. The second motion ends, and the first control is performed as appropriate.

A time limit or a limit of the position of the arm 200 is set for the second control. The second control ends when the limit is reached or when contact of one of the supporter 131 or the supporter 132 with the object 500 is detected. When contact with the object 500 is not detected but the limit is reached, the hand controller 150 and the arm controller 250 stop the motion of the hand 100*a* and the arm 200. The hand controller 150 may emit a notification of the abnormality.

Advantages of the second embodiment will now be described.

According to the hand 100*a* according to the second embodiment, similarly to the first embodiment, the first control and the second control are performed. The hand controller 150 performs the first control when the stability of the gripping of the object by the hand 100 is estimated. In the first control, the hand controller 150 causes the driver 140 to perform the first motion to increase the stability. The first control can further increase the stability of the gripping. The gripped object can be transferred more stably.

When the stability is not estimated, the hand controller 150 performs the second control. In the second control, the hand controller 150 causes the driver 140 to perform the preset second motion. Due to the second control, the hand 100*a* can grip the object even when the stability is not estimated. Cases where the hand 100 cannot grip the object can be suppressed, and the reliability of the gripping can be increased.

Because the stability is calculated using the characteristic information including the weight, size, and the like of the object, the takt time of the transfer can be reduced while suppressing degradation of the gripping stability.

As an example of the motion according to the second embodiment, when the hand 100*a* is moved to the grip position and contacts the object, the hand 100*a* or the arm 200 is moved to increase the grip force on the object by the hand 100*a*. For example, the distance between the supporter 131 and the supporter 132 is reduced, and the object is pinched more strongly by these supporters. When the hand 100*a* is moved to the grip position but does not contact the object, the hand 100 is moved according to a preset motion pattern. For example, the arm 200 moves the hand 100 while the distance between the supporter 131 and the supporter 132 is changed.

According to this motion, the stability of the gripping or the reliability of the gripping can be increased, and the operational reliability of the hand 100*a*, the handling robot 10, or the handling system 1 can be increased.

The second embodiment is applicable not only when gripping a placed object, but also while transferring the object. For example, the stability may decrease while transferring the object when the object is tilted or deformed. In such a case as well, the stability of the gripping can be increased by increasing the grip force by driving the supporters 131 and 132 with the actuators 141 and 142.

Figure 17:
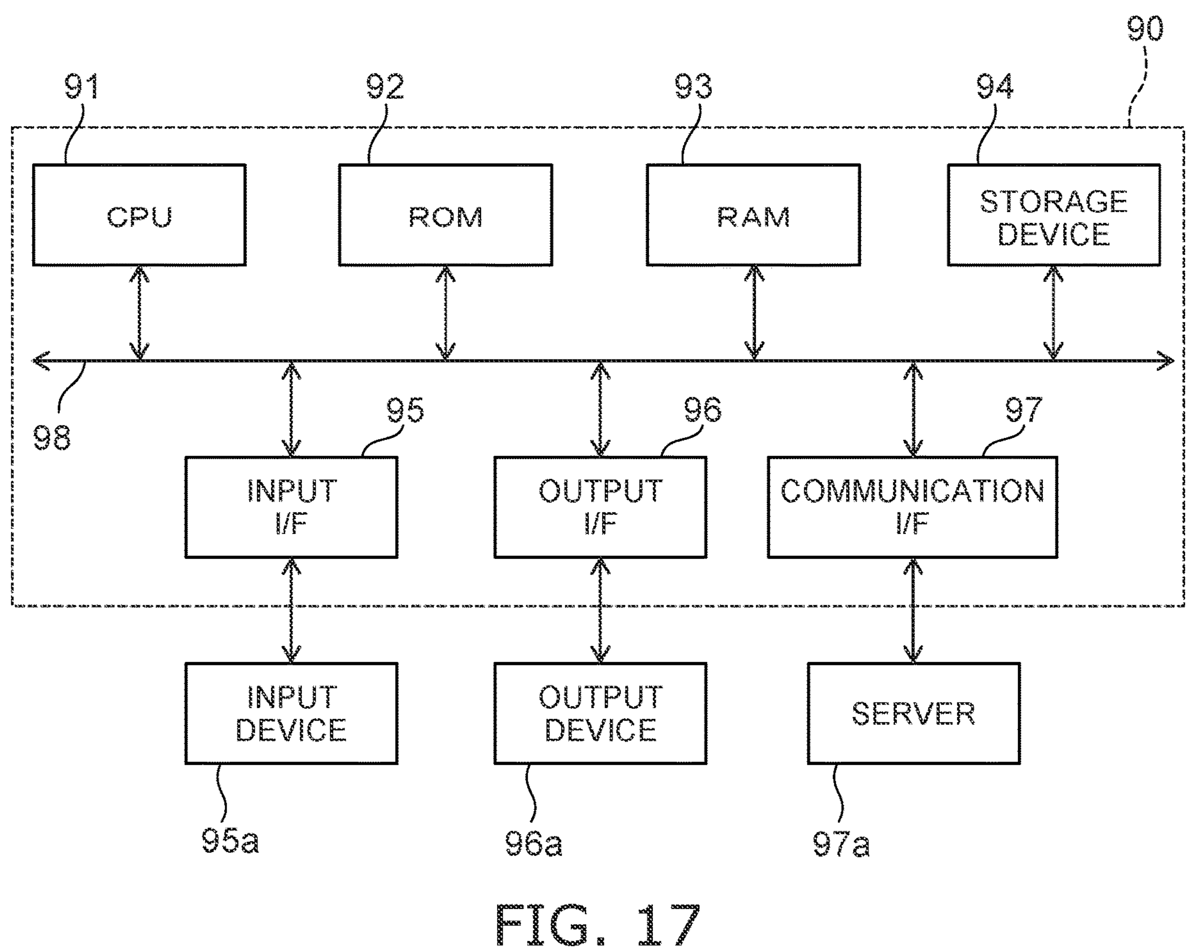
FIG. 17 is a schematic view showing a hardware configuration.

FIG. 17 is a schematic view showing a hardware configuration.

The hand controller 150, the arm controller 250, and the robot controller 300 each include, for example, the hardware configuration shown in FIG. 17. A processing device 90 shown in FIG. 17 includes a CPU 91, ROM 92, RAM 93, a storage device 94, an input interface 95, an output interface 96, and a communication interface 97. The multiple processing devices 90 are used as control devices that function respectively as the hand controller 150, the arm controller 250, and the robot controller 300.

The ROM 92 stores programs that control the operations of a computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the storage device 94. When executing the programs, the CPU 91 executes various processing by controlling configurations via a system bus 98.

The storage device 94 stores data necessary for executing the programs and/or data obtained by executing the programs.

The input interface (I/F) 95 connects the processing device 90 and an input device 95*a*. The input I/F 95 is, for example, a serial bus interface such as USB, etc. The CPU 91 can read various data from the input device 95*a* via the input I/F 95.

The output interface (I/F) 96 connects the processing device 90 and an output device 96*a*. The output I/F 96 is, for example, an image output interface such as Digital Visual Interface (DVI), High-Definition Multimedia Interface (HDMI (registered trademark)), etc. The CPU 91 can transmit data to the output device 96*a* via the output I/F 96 and cause the output device 96*a* to display an image.

The communication interface (I/F) 97 connects the processing device 90 and a server 97*a* outside the processing device 90. The communication I/F 97 is, for example, a network card such as a LAN card, etc. The CPU 91 can read various data from the server 97*a* via the communication I/F 97. For example, the detection results of the sensors 21 to 25 are stored in the server 97*a*.

The storage device 94 includes at least one selected from a hard disk drive (HDD) and a solid state drive (SSD). The input device 95*a* includes at least one selected from a mouse, a keyboard, a microphone (audio input), and a touchpad. The output device 96*a* includes at least one selected from a monitor and a projector. A device such as a touch panel that functions as both the input device 95*a* and the output device 96*a* may be used.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

Examples are described above in which the hand controller is embedded in the hand. The hand controller is not limited to the example, and may be located outside the hand. In such a case, data is transmitted and received by wired communication or wireless communication between the hand controller and a communication interface located in the hand. Similarly to the embodiments described above, the object can be gripped more stably even when such a hand system is used.

The embodiments may include the following configurations.

Configuration 1

A hand, comprising:
a gripper configured to grip an object;
a driver driving the gripper; and
a controller,
when a stability when gripping the object is estimated, the controller causing the driver to perform a first motion to increase the stability based on
contact information of the gripper for the object, and
characteristic information including at least one of a size or a weight of the object.

Configuration 2

The hand according to Configuration 1, wherein
when the stability is not estimated, the controller causes the driver to perform a second motion, and
the second motion is preset.

Configuration 3

The hand according to Configuration 2, wherein
when the stability is estimated while the second motion is being performed, the controller causes the driver to end the second motion and perform the first motion.

Configuration 4

The hand according to any one of Configurations 1 to 3, wherein
in the estimation of the stability, the controller:
estimates a grip state based on the contact information and a grip position at which the object is gripped, the grip position being pre-calculated; and
calculates the stability based on the grip state.

Configuration 5

The hand according to any one of Configurations 1 to 4, wherein
when the stability exceeds a first threshold in the first motion, the controller determines that a gripping motion is completed, and
the first threshold is preset.

Configuration 6

The hand according to any one of Configurations 1 to 5, wherein
the gripper includes a suction mechanism configured to suction-grip the object.

Configuration 7

The hand according to Configuration 6, wherein
the gripper includes a pad contacting the object, and
the controller acquires the contact information based on a detected value of a pressure inside the pad.

Configuration 8

The hand according to Configuration 6 or 7, wherein
the driver includes a rotation axis changing a posture of the gripper, and
in the first motion, the controller:
calculates a rotation angle of the rotation axis based on the stability, and
rotates the rotation axis not less than the rotation angle to increase the stability.

Configuration 9

The hand according to any one of Configurations 1 to 5, wherein
the gripper includes a pinching mechanism configured to pinch the object.

Configuration 10

The hand according to Configuration 9, wherein
the pinching mechanism includes a plurality of supporters,
the pinching mechanism is configured to pinch the object by using the plurality of supporters,
the driver includes a motor for driving the plurality of supporters, and
the controller acquires the contact information based on a current value of the motor.

Configuration 11

The hand according to Configuration 10, wherein
a distance between the plurality of supporters is changed by an operation of the motor, and
in the first motion, the controller:
calculates a rotation angle of the motor based on the stability; and
rotates the motor not less than the rotation angle to increase the stability.

Configuration 12

The hand according to any one of Configurations 1 to 11, wherein
the characteristic information further includes a center of gravity of the object.

Configuration 13

The hand according to any one of Configurations 1 to 12, wherein the stability is expressed as a ratio of a grip force when the object is gripped to a necessary grip force, and the necessary grip force is necessary to grip and transfer the object.

Configuration 14

A handling robot, comprising:

the hand according to any one of Configurations 1 to 13; and an arm to which the hand is mounted, the arm changing a position or a posture of the hand.

Configuration 15

The robot according to Configuration 14, wherein the position and the posture of the hand are changed by the arm to increase the stability in the first motion.

Configuration 16

A handling robot, comprising:

an arm; and a hand mounted to the arm, the hand being configured to grip an object, the arm moving the hand to a grip position, the grip position being pre-calculated, when the hand contacts the object at the grip position, the hand or the arm being moved to increase a grip force of the object by the hand, and when the hand does not contact the object at the grip position, the hand being moved according to a motion pattern, the motion pattern being preset.

Configuration 17

The robot according to Configuration 16, wherein when the hand contacts the object in the motion pattern, the motion pattern is stopped, and the hand or the arm is moved to increase the grip force of the object by the hand.

Configuration 18

The robot according to Configuration 16 or 17, wherein the hand includes a plurality of pads configured to suction-grip the object; and when only a portion of the plurality of pads contacts the object at the grip position, a posture of the hand is changed so that more of the pads contact the object.

Configuration 19

The robot according to Configuration 16 or 17, wherein the hand includes a plurality of supporters configured to pinch the object, and when none of the plurality of supporters contact the object at the grip position, the hand is moved while changing a distance between the plurality of supporters.

Configuration 20

A control device of a hand, the hand including:

a gripper configured to grip an object; and a driver driving the gripper, when a stability is estimated when gripping the object, the control device causes the driver to perform a first motion to increase the stability based on:

contact information of the hand for the object; and characteristic information including at least one of a size or a weight of the object.

Configuration 21

A method for controlling a hand, the hand including:

a gripper configured to grip an object; and a driver driving the gripper, the method comprising:

causing the driver to perform a first motion to increase a stability when the stability is estimated when gripping the object, the first motion being based on:

contact information of the hand for the object; and characteristic information including at least one of a size or a weight of the object.

Configuration 22

A program causing a computer to execute the method according to Configuration 21.

Configuration 23

A storage medium in which the program according to Configuration 22 is stored.

According to the embodiments described above, a hand, a handling robot, a handling system, a control device, a method for controlling a hand, a program, and a storage medium, by which the object can be gripped more stably, are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A hand, comprising:

a gripper configured to grip an object;

a driver configured to drive the gripper; and a controller configured to generate a gripping plan using an image of the object, the gripping plan including a grip position and a grip posture, after generating the gripping plan that includes the grip position and the grip posture, cause the driver to drive the gripper to the grip position and the grip posture, after generating the gripping plan that includes the grip position and the grip posture, estimate a stability when gripping the object, the stability being estimated based on contact information of the gripper for the object and characteristic information including at least one of a size or a weight of the object, the contact information being generated at the grip position and in the grip posture, cause the driver to perform a first motion to increase the stability in a case where the stability is estimated and does not exceed a first threshold, and during the first motion, determine that a gripping motion is completed in a case where the stability exceeds the first threshold.

2. The hand according to claim 1, wherein in a case where the stability is not estimated, the controller causes the driver to perform a second motion, and the second motion is preset.

3. The hand according to claim 2, wherein in a case where the stability is estimated during the second motion, the controller causes the driver to end the second motion and perform the first motion.

4. The hand according to claim 1, wherein in the estimation of the stability, the controller is configured to:

estimate a grip state based on the contact information and the grip position; and calculate the stability based on the grip state.

5. The hand according to claim 1, wherein in a case where the stability is estimated and exceeds the first threshold before performing the first motion, the first motion is not performed.

6. The hand according to claim 1, wherein the gripper includes a suction mechanism configured to suction-grip the object.

7. The hand according to claim 6, wherein the gripper includes a pad contacting the object, and the controller is configured to acquire the contact information based on a detected value of a pressure inside the pad.

8. The hand according to claim 6, wherein the driver includes a rotation axis changing a posture of the gripper, and in the first motion, the controller is configured to:

calculate a rotation angle of the rotation axis based on the stability, and rotate the rotation axis not less than the rotation angle to increase the stability.

9. The hand according to claim 1, wherein the gripper includes a pinching mechanism configured to pinch the object.

10. The hand according to claim 9, wherein the pinching mechanism includes a plurality of supporters, the pinching mechanism is configured to pinch the object by using the plurality of supporters, the driver includes a motor for driving the plurality of supporters, and the controller is configured to acquire the contact information based on a current value of the motor.

11. The hand according to claim 10, wherein a distance between the plurality of supporters is changed by an operation of the motor, and in the first motion, the controller is configured to:

calculate a rotation angle of the motor based on the stability; and rotate the motor not less than the rotation angle to increase the stability.

12. The hand according to claim 1, wherein the characteristic information further includes a center of gravity of the object.

13. The hand according to claim 1, wherein the stability is expressed as a ratio of a grip force when the object is gripped to a necessary grip force, and the necessary grip force is necessary to grip and transfer the object.

14. A handling robot, comprising:

the hand according to claim 1; and an arm to which the hand is mounted, the arm being configured to change a position or a posture of the hand.

15. The robot according to claim 14, wherein the position and the posture of the hand are changed by the arm to increase the stability in the first motion.

16. A handling robot, comprising:

the hand according to claim 1; and an arm to which the hand is mounted, in a case where the hand contacts the object at the grip position, the hand or the arm being moved to increase a grip force of the object by the hand, and in a case where the hand does not contact the object at the grip position, the hand being moved according to a motion pattern, the motion pattern being preset.

17. The robot according to claim 16, wherein in a case where the hand contacts the object in the motion pattern, the motion pattern is stopped, and the hand or the arm is moved to increase the grip force of the object by the hand.

18. A control device of a hand, the hand including:

a gripper configured to grip an object; and a driver configured to drive the gripper, the control device comprising: circuitry configured to generate a gripping plan using an image of the object, the gripping plan including a grip position and a grip posture, after generating the gripping plan that includes the grip position and the grip posture, cause the driver to drive the gripper to the grip position and the grip posture, after generating the gripping plan that includes the grip position and the grip posture, estimate a stability when gripping the object, the stability being estimated based on contact information of the hand for the object and characteristic information including at least one of a size or a weight of the object, the contact information being generated at the grip position and the grip posture, cause the driver to perform a first motion to increase the stability in a case where the stability is estimated and does not exceed a first threshold, and during the first motion, determine that a gripping motion is completed in a case where the stability exceeds the first threshold.

19. A method for controlling a hand, the hand including:

a gripper configured to grip an object; and a driver configured to drive the gripper, the method comprising:

generating a gripping plan using an image of the object, the gripping plan including a grip position and a grip posture;

after generating the gripping plan that includes the grip position and the grip posture, causing the driver to drive the gripper to the grip position and the grip posture;

after generating the gripping plan that includes the grip position and the grip posture, estimating a stability when gripping the object, the stability being estimated based on contact information of the gripper for the object and characteristic information including at least one of a size or a weight of the object, the contact information being generated at the grip position and the grip posture;

causing the driver to perform a first motion to increase the stability in a case where the stability is estimated and the stability does not exceed a first threshold; and during the first motion, determining that a gripping motion is completed in a case where the stability exceeds the first threshold.

20. A non-transitory computer-readable storage medium in which a program is stored, the program causing a computer to execute the method according to claim 19.

21. The hand according to claim 1, wherein in a case where the stability is not more than the first threshold after completion of the first motion, the controller is configured to repeat a process including estimating the stability and cause the driver to perform the first motion until the stability exceeds the first threshold.

22. The hand according to claim 2, wherein in a case where the stability is not estimated while the driver is performing the second motion, the controller is configured to return processing to estimating the stability based on newly generated contact information.

23. The control method according to claim 19, further comprising, in a case where the stability is not more than the first threshold after completion of the first motion, repeating a process including estimating the stability and causing the driver to perform the first motion until the stability exceeds the first threshold.

24. The control method according to claim 19, further comprising:

in a case where the stability is not estimated, causing the driver to perform a second motion that is a preset motion pattern; and in a case where the stability is not estimated while the driver is performing the second motion, returning to estimating the stability based on newly generated contact information.

* * * * *